(12) United States Patent
Nagla et al.

(10) Patent No.: US 10,755,327 B2
(45) Date of Patent: Aug. 25, 2020

(54) DISTRIBUTED LEDGER PLATFORM FOR VEHICLE RECORDS

(71) Applicant: ROYAL BANK OF CANADA, Montreal (CA)

(72) Inventors: Gaurav Nagla, Oakville (CA); Iustina-Miruna Vintila, Bucharest (RO)

(73) Assignee: ROYAL BANK OF CANADA, Montreal (CA)

( * ) Notice: Subject to any disclaimer, the term of this patent is extended or adjusted under 35 U.S.C. 154(b) by 401 days.

(21) Appl. No.: 15/652,532

(22) Filed: Jul. 18, 2017

(65) Prior Publication Data
US 2018/0018723 A1    Jan. 18, 2018

Related U.S. Application Data

(60) Provisional application No. 62/363,788, filed on Jul. 18, 2016, provisional application No. 62/433,293, filed on Dec. 13, 2016.

(51) Int. Cl.
| | |
|---|---|
| *G06Q 30/00* | (2012.01) |
| *G06Q 30/06* | (2012.01) |
| *G06F 21/62* | (2013.01) |
| *H04L 9/32* | (2006.01) |
| *H04L 29/06* | (2006.01) |
| *G06Q 20/38* | (2012.01) |
| *G06Q 20/40* | (2012.01) |
| *G06Q 30/08* | (2012.01) |
| *G06Q 40/02* | (2012.01) |

(52) U.S. Cl.
CPC ..... *G06Q 30/0609* (2013.01); *G06F 21/6218* (2013.01); *G06Q 20/388* (2013.01); *G06Q 20/4014* (2013.01); *G06Q 30/08* (2013.01); *H04L 9/3236* (2013.01); *H04L 9/3247* (2013.01); *H04L 63/08* (2013.01); *H04L 63/102* (2013.01); *H04L 63/123* (2013.01); *G06Q 30/014* (2013.01); *G06Q 40/025* (2013.01); *G06Q 2220/00* (2013.01); *H04L 2209/38* (2013.01); *H04L 2209/84* (2013.01)

(58) Field of Classification Search
CPC .................................................. G06Q 30/0609
See application file for complete search history.

(56) References Cited

U.S. PATENT DOCUMENTS

| | | |
|---|---|---|
| 2015/0379510 A1 | 12/2015 | Smith |
| 2017/0048216 A1 | 2/2017 | Chow et al. |

OTHER PUBLICATIONS

Witkowski, R. (Jun. 20, 2016). SEC official says ethereum hack illustrates blockchain concerns; hack spurs questions of whether blockchain should be used as a public or private system. Wall Street Journal (Online) Retrieved from https://search.proquest.com/docview/1798021194?accountid=14753.*

(Continued)

*Primary Examiner* — Kathleen Palavecino
(74) *Attorney, Agent, or Firm* — Norton Rose Fulbright Canada LLP; Maya Medeiros

(57) ABSTRACT

Embodiments described herein provide a vehicle record platform using blockchain technology. Vehicle records are recorded using blocks linked by vehicle identification number. The vehicle record stores historical information about vehicles, including collision information, financing information, transfer of ownership information, and other transaction information.

13 Claims, 17 Drawing Sheets

(56) References Cited

OTHER PUBLICATIONS

WIPO, International Search Report and Written Opinion for PCT Application No. PCT/CA2017/050863 dated Oct. 30, 2017.
Extended European Search Report issued in European Application No. 17830146.1, dated Jan. 31, 2020, dated Feb. 7, 2020.
Swan, M. "E-Commerce", Jan. 22, 2015, retrieved from the Internet URL: http://w2.blockchain-tec.net/blockchain/blockchain-by-melanie-swan.pdf. XP055406241.
Antonopoulos, A. "Mastering Bitcoin—Unlocking Digital Cryptocurrencies", O'Reilly Media, Beijing Cambridge Farmham Koln Sebastopl Tokyo, XP55306939, ISNB: 978-1-4493-7404-4.
Hardjono, T. et,. al., "Draft—Please Do Not Disturb Verifiable Anonymous Identities and Access Control in Permissioned Blockchains", Apr. 17, 2016, retrieved from the Internet URL http://connection.mit.edu/wp-content/uploads/sites/29/2014/12/ChainAnchor-Identities-04172016.pdf. XP055392888.

* cited by examiner

| Permission table (<u>R</u>ead vs <u>W</u>rite Access) by Key Stakeholder | OEM | Dealer | Buyer | Seller | Insurance Provider | Financing Company | Collision Reporting Center | Owner | Registration Agency |
|---|---|---|---|---|---|---|---|---|---|
| VIN Creation | W | | | | | | | | |
| Warranty | W | W | | | | | | | |
| Packages / Accessories added to vehicle purchase | W | W | | | | | | | |
| Servicing | | W | | | | | | | |
| Accident History | | | | | W | | W | | |
| Claims / Repair Estimates | | W | | | W | | | | |
| Loan Information | | | | | | W | | | |
| Insurance Information | | | | | W | | | | |
| Registration Information | | | | | | | | | W |
| Recalls | W | | | | | | | | |
| Sale Price | | W | | W | | | | | |

OEM (Original Equipment Manufacturer): The auto manufacturer who builds the vehicle.
Dealer: The auto dealer who sells and services the vehicle (new or used) manufactured by the OEM.
Buyer: The individual or dealer who is looking to buy the vehicle.
Seller: The individual or dealer who is looking to sell the vehicle.
Insurance provider: The insurance company who insures the vehicle.
Financing Company: Any financial institution or captive who provides vehicle loans.
Collision Reporting Center: An entity of Police services responsible for reporting collisions and vehicle damage.
Owner: The individual, dealer, OEM or any other entity that owns the vehicle.
Registration Agency: The government body who provides permit identifying the legal owner of the vehicle, license plate and license plate validation sticker.

FIG. 13

DISTRIBUTED LEDGER PLATFORM FOR VEHICLE RECORDS

CROSS REFERENCE TO RELATED APPLICATIONS

This application claims priority to and the benefit of U.S. Provisional Application Ser. No. 62/363,788 filed Jul. 18, 2016 and U.S. Provisional Application Ser. No. 62/433,293 filed Dec. 13, 2016, the entire contents of both are hereby incorporated by reference.

FIELD

Embodiments described herein generally relate to the field of distributed ledger platforms and vehicle records.

INTRODUCTION

Over the life of a vehicle there may be a number of transactions relating to the vehicle including changes of ownership, repairs, accidents, and financings. A vehicle data record can store information about the life of a vehicle.

Records maintained by conventional techniques may be susceptible to tampering, unauthorized changes and inadvertent changes. Records maintained by conventional techniques may be incomplete. Further, it may be difficult to ascertain the integrity and veracity of records maintained by parties which may have a vested interest in relation to the records being kept.

A distributed ledger platform is a decentralized distributed database platform. A blockchain has data structure blocks that represent transactions, data records or applications (e.g. smart contracts). An example distributed ledger platform is a blockchain platform.

SUMMARY

In accordance with an aspect, there is provided a computer-implemented process for vehicle records. The process can involve: providing a distributed ledger by a plurality of nodes, each node including at least a computing device, the distributed ledger having a plurality of blocks, each block comprising a vehicle identification number, vehicle data, a timestamp indicating when the block was created, a hash reference for the ledger; generating a vehicle listing of a vehicle record comprising a set of blocks of the plurality blocks, each block of the set of blocks having the same vehicle identification number; receiving a bid for the vehicle listing from a buyer; transmitting a notification of the bid to a seller; receiving an acceptance of the bid from the seller; generating a smart contract for the vehicle listing, the smart contract including a buyer electronic signature, a seller electronic signature, and transaction terms; determining that the transaction terms are satisfied and releasing payment; and recording another block on the distributed ledger for the transaction, the other block comprising the same vehicle identification number, buyer identification, seller identification, and the smart contract.

In some embodiments, the process can involve verifying the seller by receiving seller credentials prior to transmitting the notification.

In some embodiments, the process can involve verifying the buyer by receiving buyer credentials and providing access to the vehicle record.

In some embodiments, a block of the set of blocks is an initial block for the vehicle record, the initial block comprising a vehicle registration, ownership attributes, and permission attributes for the vehicle record.

In some embodiments, the process can involve verifying the seller by receiving seller credentials and comparing the seller credentials to the ownership attributes.

In some embodiments, the process can involve verifying the buyer by receiving buyer credentials, comparing the buyer credentials to the permission attributes, and providing access to the vehicle record.

In some embodiments, the process can involve receiving a vehicle registration request, verifying the vehicle registration request, and generating an initial block for the vehicle record, the initial block comprising a vehicle registration, ownership attributes, permission attributes for the vehicle record, and the same vehicle identification number.

In some embodiments, the process can involve receiving a vehicle service event identifying the same vehicle identification number and generating an additional block for the vehicle record, the additional block comprising repair attributes and the same vehicle identification number.

In some embodiments, the process can involve receiving a vehicle accident event identifying the same vehicle identification number and generating an additional block for the vehicle record, the additional block comprising accident attributes and the same vehicle identification number.

In some embodiments, the process can involve receiving a manufacturer recall event identifying the same vehicle identification number and generating an additional block for the vehicle record, the additional block comprising recall attributes and the same vehicle identification number.

In some embodiments, the process can involve receiving a seller registration request, verifying the seller registration request, generating an additional block for the vehicle record, the additional block comprising seller attributes and the same vehicle identification number.

In some embodiments, the process can involve receiving a buyer registration request, verifying the buyer registration request, and generating an additional block for the vehicle record, the additional block comprising buyer attributes and the same vehicle identification number.

In some embodiments, the process can involve receiving a credit risk request for the buyer, receiving a credit score for the buyer, and generating an additional block for the vehicle record, the additional block comprising buyer attributes, the credit score, and the same vehicle identification number.

In some embodiments, the process can involve receiving a vehicle search request with a set of parameters and identifying the vehicle record based on the vehicle search request by comparing the set of parameters to the vehicle data of the vehicle record.

In accordance with an aspect, there is provided a system for vehicle records. The system can involve: a distributed ledger of a plurality of nodes, each node including at least a computing device, the distributed ledger having a plurality of blocks, each block comprising a vehicle identification number, vehicle data, a timestamp indicating when the block was created, and a hash reference for the ledger; a vehicle marketplace engine configured to generate a vehicle listing of a vehicle record comprising a set of blocks of the plurality blocks, each block of the set of blocks having the same vehicle identification number; a buyer and seller application configured to: receive a bid for the vehicle listing from a buyer; transmit a notification of the bid to a seller; receive an acceptance of the bid from the seller; a smart contracts middleware layer configured to generate a smart contract for the vehicle listing, the smart contract including a buyer electronic signature, a seller electronic signature, and transaction terms; and an integration middleware layer configured to: determine that the transaction terms are satisfied and release payment; and record another block on the distributed ledger for the transaction, the other block comprising the same vehicle identification number, buyer identification, seller identification, and the smart contract.

In some embodiments, the system can involve a security unit configured to verify the seller by receiving seller credentials prior to transmitting the notification.

In some embodiments, the system can involve a security unit configured to verify the buyer by receiving buyer credentials and providing access to the vehicle record.

In some embodiments, a block of the set of blocks is an initial block for the vehicle record, the initial block comprising a vehicle registration, ownership attributes, and permission attributes for the vehicle record.

In some embodiments, the system can involve a security unit configured to verify the seller by receiving seller credentials and comparing the seller credentials to the ownership attributes.

In some embodiments, the system can involve a security unit configured to verify the buyer by receiving buyer credentials, comparing the buyer credentials to the permission attributes, and providing access to the vehicle record.

In some embodiments, the integration middleware layer is configured to receive a vehicle registration request, verify the vehicle registration request, and generate an initial block for the vehicle record, the initial block comprising a vehicle registration, ownership attributes, permission attributes for the vehicle record, and the same vehicle identification number.

In some embodiments, the system can involve a vehicle history application configured to receive a vehicle service event identifying the same vehicle identification number and generate an additional block for the vehicle record, the additional block comprising repair attributes and the same vehicle identification number.

In some embodiments, the system can involve a vehicle history application configured to receive a vehicle accident event identifying the same vehicle identification number and generate an additional block for the vehicle record, the additional block comprising accident attributes and the same vehicle identification number.

In some embodiments, the system can involve a vehicle history application configured to receive a manufacturer recall event identifying the same vehicle identification number and generate an additional block for the vehicle record, the additional block comprising recall attributes and the same vehicle identification number.

In some embodiments, the buyer and seller application is configured to receive a seller registration request, verify the seller registration request, generate an additional block for the vehicle record, the additional block comprising seller attributes, and the same vehicle identification number.

In some embodiments, the buyer and seller application is configured to receive a buyer registration request, verify the buyer registration request, and generate an additional block for the vehicle record, the additional block comprising buyer attributes and the same vehicle identification number.

In some embodiments, the buyer and seller application is configured to receive a credit risk request for the buyer, receive a credit score for the buyer, and generate an additional block for the vehicle record, the additional block comprising buyer attributes, the credit score, and the same vehicle identification number.

In some embodiments, the vehicle marketplace engine is configured to receive a vehicle search request with a set of parameters and identify the vehicle record based on the vehicle search request by comparing the set of parameters to the vehicle data of the vehicle record.

In accordance with an aspect, there is provided a computer-implemented system for maintaining vehicle records. The system can involve a plurality of nodes, each node including at least a computing device and being configured to maintain and update a distributed ledger having a plurality of blocks arranged in a distributed ledger; each block comprising a vehicle identification number, vehicle and transaction data, a timestamp indicating when the block was created, and a hash reference for the ledger; and at least one processor configured to generate a vehicle record comprising a set of blocks of the plurality blocks, each block of the set of blocks having the same vehicle identification number.

In some embodiments, a block of the set of blocks is an initial block for the vehicle record, the initial block comprising a vehicle registration, ownership attributes, and permission attributes for the vehicle record.

In some embodiments, the permission attributes authorize a node of the plurality of nodes to create a new block for insertion into the set of blocks of the vehicle record, update an existing block in the set of blocks of the vehicle record, delete the existing block in the set of blocks of the vehicle record, and retrieve the vehicle and transaction data from one or more blocks in the set of blocks of the vehicle record.

In some embodiments, the vehicle and transaction data includes data extracted from a machine-readable contract provided in a domain specific language format.

In some embodiments, each node of the plurality of nodes is one or more computing devices associated with a financial institution.

In some embodiments, the plurality of nodes includes one or more anonymous computing devices.

In some embodiments, the distributed ledger is publicly accessible.

In some embodiments, the distributed ledger is accessible only by computing devices associated with the plurality of nodes.

In some embodiments, the plurality of nodes is configured for validating a new block presented by one of the plurality of nodes for insertion into the blockchain.

In some embodiments, an application tool can be generated for use with the system, the application tool configured for conducting automated confirmation of information stored on one or more records using information extracted from the distributed ledger.

In accordance with an aspect, there is provided a computer-implemented system for maintaining vehicle records. The system has a plurality of nodes, each node including at least a computing device and being configured to maintain and update a distributed ledger having a plurality of blocks arranged in a blockchain; each block comprising a vehicle identification number, vehicle and transaction data, a timestamp indicating when the block was created, and a hash reference for the blockchain. A vehicle record is a set of blocks of the plurality blocks, each block of the set of blocks comprising the same vehicle identification number.

A block of the set of blocks is an initial block for the vehicle record, the initial block comprising a vehicle registration, ownership attributes, and permission attributes for the vehicle record. The permission attributes authorize a node of the plurality of nodes to create a new block for insertion into the set of blocks of the vehicle record, update an existing block in the set of blocks of the vehicle record, delete the existing block in the set of blocks of the vehicle record, and retrieve the vehicle and transaction data from one or more blocks in the set of blocks of the vehicle record.

In some embodiments, the vehicle and transaction data includes data extracted from a machine-readable contract provided in a domain specific language format.

In some embodiments, each node of the plurality of nodes is one or more computing devices associated with a financial institution. The plurality of nodes includes one or more anonymous computing devices.

In some embodiments, the distributed ledger is publicly accessible.

In some embodiments, the distributed ledger is accessible only by computing devices associated with the plurality of nodes.

In some embodiments, the plurality of nodes is configured for validating a new block presented by one of the plurality of nodes for insertion into the blockchain.

In some embodiments, there is provided a tool for use with the system, the tool being configured for conducting automated confirmation of information stored on one or more records using information extracted from the distributed ledger.

In another aspect, there is provided a system for vehicle records. The system includes a distributed ledger of a plurality of nodes, each node including at least a computing device, and the distributed ledger having a plurality of blocks, each block comprising a vehicle identification number, vehicle data, a timestamp indicating when the block was created, and a hash reference for the ledger; a vehicle history application configured to: register a vehicle corresponding to a first vehicle identification number and a first owner; record a set of blocks of the plurality blocks on the distributed ledger, each block of the set of blocks having the first vehicle identification number, the set of block including an initial block for the vehicle registration, the initial block comprising ownership attributes for the first owner, and permission attributes for the vehicle record; receive notification of a vehicle event for the vehicle; record an additional block on the distributed ledger, the additional block having the first vehicle identification number and event attributes; generate a vehicle record using the first vehicle identification number, the vehicle record comprising the set of blocks and the additional block, each block of the vehicle record having the first vehicle identification number; and transmit the vehicle record to an interface, enterprise system or external system.

In some embodiments, the vehicle history application is configured to receive a vehicle service event for the vehicle, generate another block for the vehicle record, the other block comprising repair attributes, and the first vehicle identification number.

In some embodiments, the vehicle history application is configured to receive a vehicle accident event identifying the first vehicle identification number and generate another block for the vehicle record, the other block comprising accident attributes and the first vehicle identification number.

In some embodiments, the vehicle history application is configured to receive a manufacturer recall event identifying the first vehicle identification number and generate another block for the vehicle record, the other block comprising recall attributes and the first vehicle identification number.

In some embodiments, the vehicle history application is configured to receive a registration request to register the vehicle from an OEM system.

In some embodiments, a security unit is configured to verify the OEM system prior to the registration of the vehicle.

In some embodiments, a security unit is configured to verify the interface, the enterprise system or the external system providing access to the vehicle record.

In some embodiments, a vehicle marketplace engine is configured to generate a vehicle listing of a set of vehicle records, the set of vehicle records comprising the vehicle record for the vehicle corresponding the first vehicle identification number.

In some embodiments, a buyer and seller application is configured to: receive a bid for the vehicle record from a buyer; transmit a notification of the bid to a seller; and receive an acceptance of the bid from the seller.

In some embodiments, a smart contracts middleware layer is configured to generate a smart contract for the vehicle listing, the smart contract including a buyer electronic signature, a seller electronic signature, and transaction terms.

In some embodiments, an integration middleware layer is configured to: determine that the transaction terms are satisfied, release payment for the transaction; and record another block on the distributed ledger for the transaction, the other block comprising the first vehicle identification number, buyer identification, seller identification, and the smart contract.

In some embodiments, a security unit is configured to verify the seller by receiving seller credentials and comparing the seller credentials to the ownership attributes.

In some embodiments, a security unit is configured to verify the buyer by receiving buyer credentials, comparing the buyer credentials to the permission attributes, and providing access to the vehicle record.

In some embodiments, the integration middleware layer is configured to receive a vehicle registration request, verify the vehicle registration request, and generate an initial block for the vehicle record, the initial block comprising a vehicle registration, ownership attributes, permission attributes for the vehicle record, and the same vehicle identification number.

In some embodiments, the buyer and seller application is configured to receive a seller registration request, verify the seller registration request, and generate an additional block for the vehicle record, the additional block comprising seller attributes and the same vehicle identification number.

In some embodiments, the buyer and seller application is configured to receive a buyer registration request, verify the buyer registration request, and generate an additional block for the vehicle record, the additional block comprising buyer attributes and the same vehicle identification number.

In some embodiments, the buyer and seller application is configured to receive a credit risk request for the buyer, receive a credit score for the buyer, and generate an additional block for the vehicle record, the additional block comprising buyer attributes, the credit score, and the same vehicle identification number.

In some embodiments, the vehicle marketplace engine is configured to receive a vehicle search request with a set of parameters and identify the vehicle record based on the vehicle search request by comparing the set of parameters to the vehicle data of the vehicle record.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures:

FIG. 13 is an example table of read and write access for different stakeholders.

DETAILED DESCRIPTION

Embodiments, platforms, methods, devices, and computer-readable media described herein provide a blockchain platform to maintain and track vehicle records using distributed ledgers or blockchains. The vehicle records include information on the vehicle history and transactions relating to vehicles.

Figure 1:
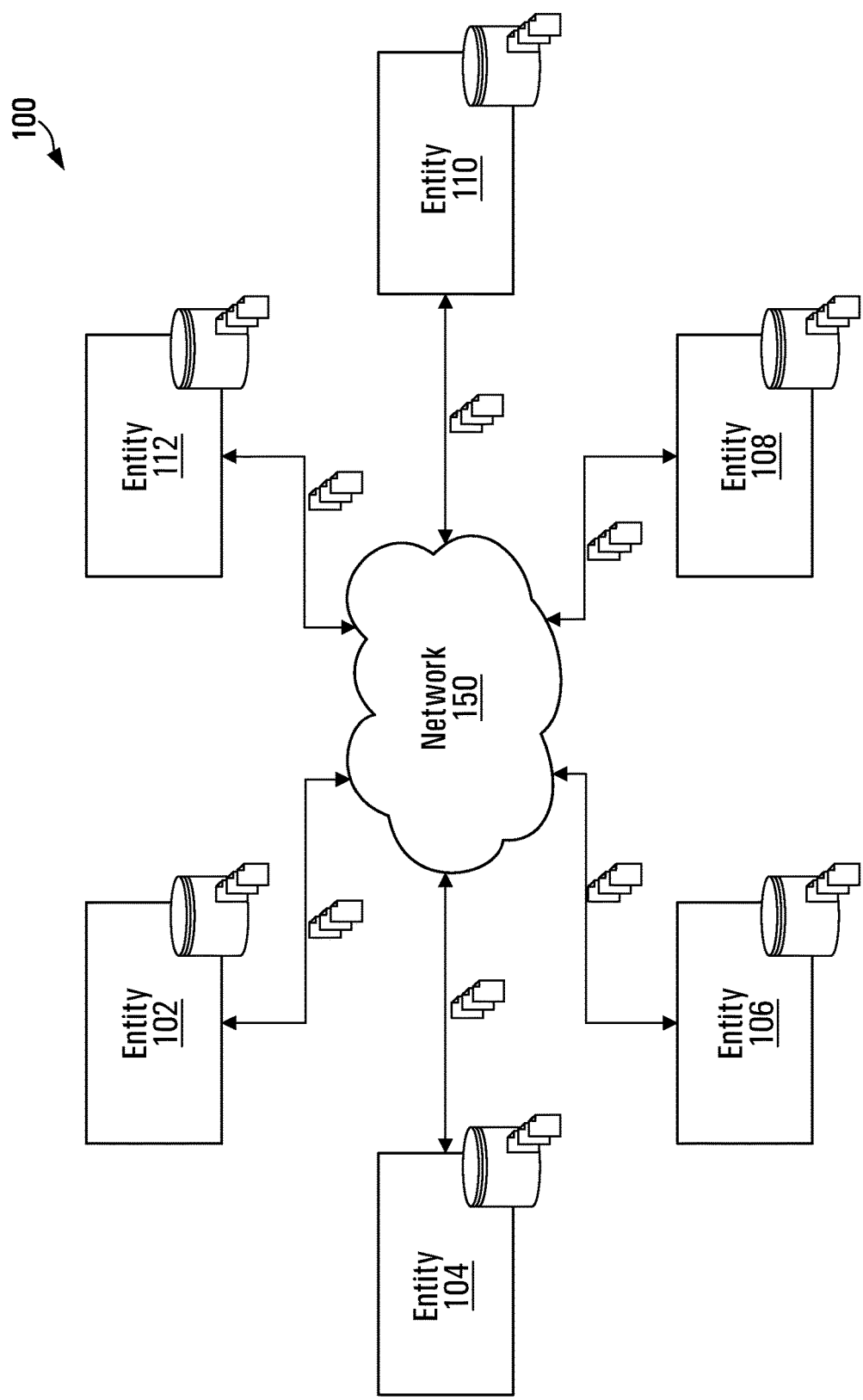
FIG. 1 is a block diagram illustrating blockchain topology.

FIG. 1 is a block diagram illustrating a blockchain topology 100 that provides one or more distributed ledgers (e.g. blockchains) across one or more entities 102, 104, 106, 108, 110, and 112, according to some embodiments. Entities 102, 104, 106, 108, 110, and 112 may include, for example, vehicle owners, financial institutions, insurance companies, parties to a transaction, individual computing devices, shared computing resources, smart devices (e.g., smartwatches, tablets, smartphones), and so on. The entities may store the distributed ledgers on computing systems which may be utilized in maintaining and/or updating the ledgers. Each entity 102, 104, 106, 108, 110, and 112 may be configured for storing a version of the distributed ledger (or a portion thereof), and the distributed ledger may be updated from time to time with modifications to the ledger and/or ledger entries, such as insertion of a ledger entry or an update of a ledger entry. The blockchain topology 100 may be adapted such that where issues arise with the distributed ledger (e.g., hash collisions, insertions at the same time, corrupted ledgers/ledger entries), the issues are automatically resolved based at least on issue resolution logic. For example, such logic may be distributed among each of the entities 102, 104, 106, 108, 110, and 112 and/or their computing systems. In some embodiments, issues may arise that can cause a distributed ledger to "fork" and/or spawn another instance, for example, where a collision cannot be automatically resolved.

In some embodiments, the entities 102, 104, 106, 108, 110, and 112 include at least a decentralized set of computing devices and may even include personal computing devices for individuals, and so on. For example, a ledger may be stored on a large number of publicly available devices, each acting as a "node" for storing a copy of the ledger (e.g., being collaboratively maintained by anonymous peers on a network). In some embodiments, the ledger is only stored and maintained on a set of trusted "nodes", such as the computing systems of authorized users. In some embodiments, a combination and/or a "mix" of both trusted nodes and public nodes may be utilized, with the same and/or different rules being applied to activities performed at each (e.g., a different validation process may be used for untrusted nodes, or simply untrusted nodes may be unable to perform certain activities). In some embodiments, there may be different levels of nodes with differing characteristics and applied business logic.

The ledgers, ledger entries, and/or information stored on the ledger entries may be used for vehicle records. Vehicle records may include information regarding transactions involving vehicles, automated "smart contracts", documents relating to vehicles, and so on. Smart contracts are computer protocols or code intended to facilitate, verify, or enforce the negotiation or performance of a contract. Further, the ledger and ledger entries may utilize encryption technology to facilitate and/or validate digital signatures, for example, facilitating multi-signature documentation, ensuring the integrity of vehicle records, and so on.

In some embodiments, the ledger is publicly accessible. In some embodiments, the ledger is only accessible to select, authorized entities having the appropriate permissions. In some embodiments, portions of the ledger are public and portions of the ledger are private. When the ledger is publicly accessible, the ledger may be adapted to only store information incidental to a transaction or a document relating to a vehicle, and may be adapted such that identifiable information is removed but validation information is maintained (e.g., storing a hash value computed from the underlying information such that a ledger entry can be utilized to validate a specific financial system entry that is held as part of an organization's business records in relation to a contractual obligation). The vehicle and transaction information stored on the ledger may be encrypted, redacted, compressed, transformed (e.g., through a one-way transformation or a reversible transformation), and so on.

Each of the one or more entities 102, 104, 106, 108, 110, and 112 may have, at various times, versions of the ledger, and the ledger may be maintained through the propagation of entries and/or updates that may be copied across ledgers. Ledger entries may contain elements of information (e.g., transaction records, document content, contract clauses, versioning information). There may be various rules and/or logic involved in activities relating to the ledger entries (e.g., creating, updating, validating, deleting), for example, a supermajority or a unanimous consent between entities may be enforced as a condition to an activity relating to an entry. In some embodiments, distributed ledgers are utilized and the ledger entries are adapted to have various linkages to one another such that the integrity of the ledger entries can be reinforced and/or validated. For example, the linkages may include hashes computed based on prior entries in the ledger, which may be utilized to determine whether a ledger entry is a fraudulent entry by reviewing the correctness of the hash based on performing the hash on information stored on prior entries.

The ledger may be maintained through, for example, a "distributed network system", the distributed network system providing decentralized control and storage of the ledger at the one or more entities (which may be considered "nodes" of the system). The number of "nodes" may be fixed or vary with time, and increasing or decreasing the number of "nodes" may impact the performance and/or security of the system. The ledger copies stored and maintained at each "node" provide cross-validation with one another in the event of conflicts between ledgers, and various cryptographic and/or hashing algorithms may be utilized during the generation, updating, deletion, linking, and so on, of ledger entries such that ledger entries have increased resiliency to unauthorized tampering or modification.

For example, a blockchain ledger may be distributed across entities 102, 104, 106, 108, 110, and 112 and used to track information relating to various vehicle assets, obligations, contracts, documents, etc. The blockchain ledger may have entries linked to one another using cryptographic vehicle records, and entries in the blockchain may be ordered, time stamped, and/or associated with metadata such that the blockchain is designed for protection against "double" transfers and unauthorized modification of ledger entries.

Figure 2:
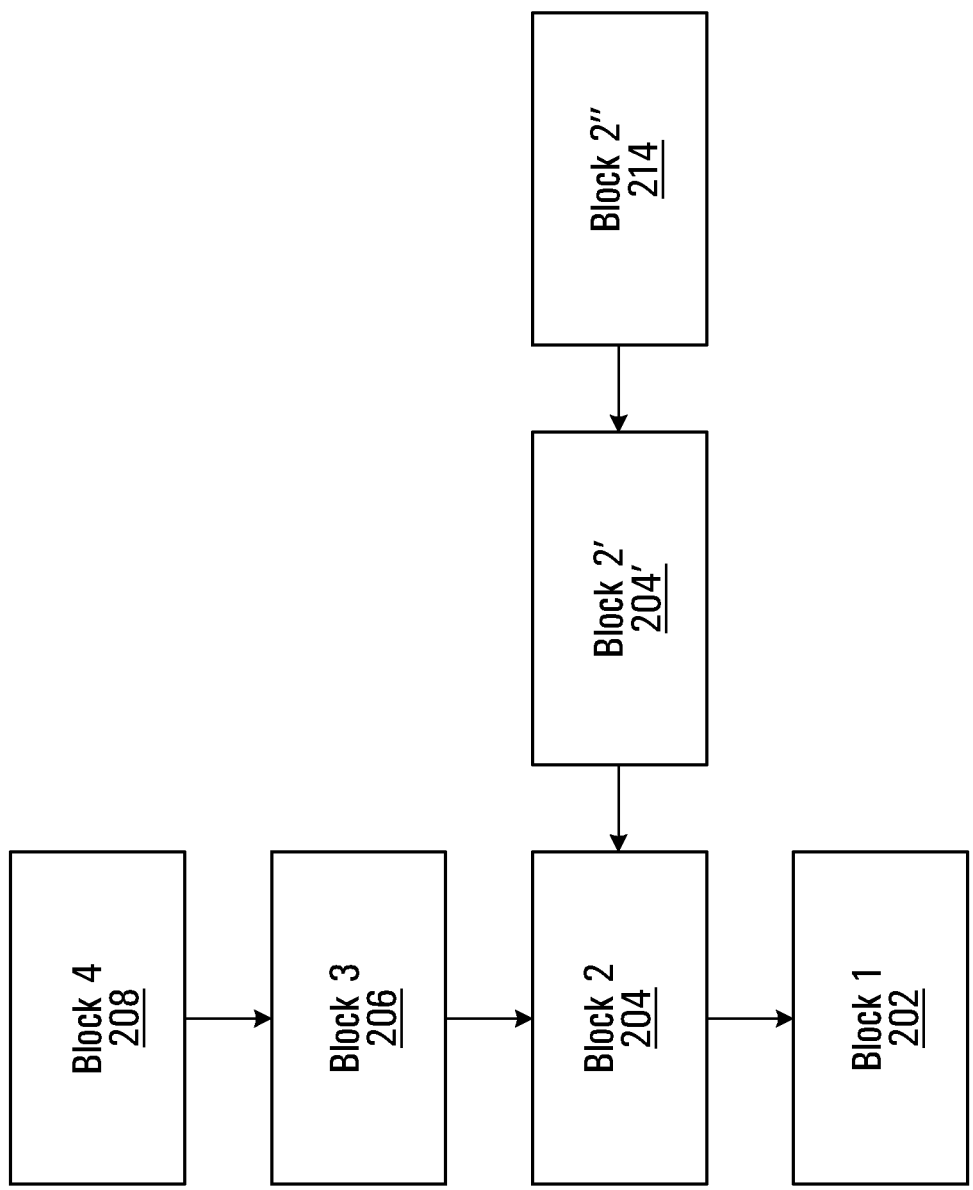
FIG. 2 is a sample blockchain structure.

FIG. 2 depicts a sample blockchain 200, according to some embodiments. Block 1 202, block 2 204, block 3 206, and block 4 208 illustrate example blocks that provide a vehicle record. As an example, block 2 204 can have different versions or updates, such as block 2' 204' and block 2" 214.

In some embodiments, each block includes a vehicle identification number (VIN) along with corresponding vehicle and transaction data. The block also includes a timestamp indicating when the block was created. If there is more than one block in the blockchain 200 each block beyond a first block further includes a hash of a previous block in the blockchain.

A VIN is a value or code that uniquely identifies a vehicle. A vehicle record can correspond to a vehicle identified by the VIN. The vehicle record is made up of a set of blocks (e.g. block 1 202, block 2 204, block 3 206, and block 4 208) with data relating to the particular vehicle. Each block for a particular vehicle record can include the same VIN (e.g. identifies the same vehicle). Different vehicle records are provided by different sets of blocks that include different VINs.

Figure 3:
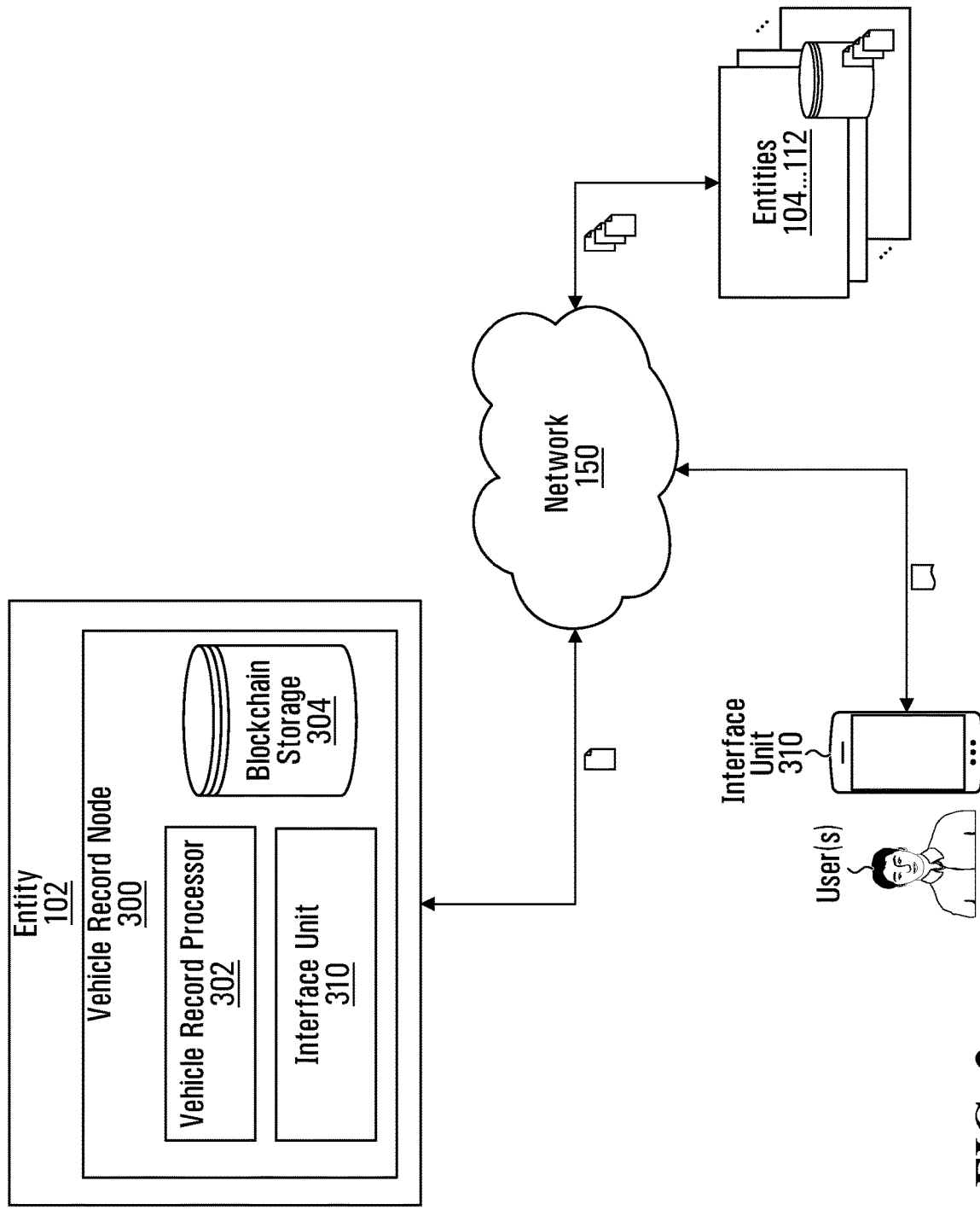
FIG. 3 is a schematic diagram of an electronic blockchain vehicle record node according to some embodiments.

FIG. 3 is a schematic diagram of an electronic blockchain vehicle record platform according to some embodiments. Entities 102, 104, 106, 108, 110, and 112 can provide a vehicle record node 300 to create and manage vehicle records using a vehicle record processor 302 and blockchain storage 304.

Vehicle records are maintained using blocks organized in blockchains stored in blockchain storage 304 of entities 102, 104, 106, 108, 110, and 112. Vehicle records store information about the life of a vehicle (e.g. car, truck, motorcycle, etc.). A vehicle owner may be able to register their vehicle to create a vehicle record. The manufacturer or dealership may also be able to register a vehicle to create a vehicle record. The vehicle record has an initial block (e.g. block 1 202) that includes vehicle registration, ownership attributes, and permission attributes for the vehicle record. The vehicle registration may be completed by the manufacturer, dealership or initial owner, for example.

The permission attributes authorize entities 102, 104, 106, 108, 110, and 112 to create a new block using a vehicle record processor 302. The new block is linked to the set of blocks of the vehicle record using the VIN, for example. The entities 102, 104, 106, 108, 110, and 112 can update an existing block in the set of blocks of the vehicle record. The permission attributes authorize entities 102, 104, 106, 108, 110, and 112 to delete the existing block in the set of blocks of the vehicle record and retrieve the vehicle and transaction data from one or more blocks in the set of blocks of the vehicle record. For example, a repair centre may create a new block for insertion into the set of blocks of the vehicle record to indicate repair details. As another example, an insurance organization may create a new block for insertion into the set of blocks of the vehicle record to indicate collision or claim details.

A vehicle record for a particular vehicle is formed by a set of blocks. Each vehicle record is indexed by a VIN uniquely identifying the particular vehicle. Each block for the vehicle record has the same VIN. Different entities 102, 104, 106, 108, 110, and 112 can create or modify blocks for a vehicle record. Each block for a particular vehicle record will be linked by a common VIN.

The vehicle record has an initial block for that vehicle indicating make/model information. The initial block can also include owner information. The initial block may be created and entered on the blockchain by the manufacturer of the vehicle, dealership, first owner, and so on. For example, a block may be created and entered on the blockchain when the vehicle is sold from the manufacturer of the vehicle or dealership to the first owner of the vehicle. The owner is granted ownership rights over the blocks for the vehicle record, and all subsequent blocks referencing that VIN.

A block of the vehicle record may store various data elements for the vehicle and transaction information, for example, the nature of the transaction, parties to the transaction, document sections, contractual clauses, version information, and/or electronic representatives or derivatives of the same. The blocks are stored in blockchain storage 304. Vehicle data can include the make of the vehicle, the model of the vehicle, mileage, and other vehicle data, for example. The transaction data can include ownership information, collision or accident information, repair information, insurance information, financing information and so on. Other examples of transaction and vehicle data include a stolen or missing status for a vehicle, recall data, and insurance or accident claims so on. The transaction and vehicle data is helpful if someone is trying to sell a stolen car especially in a peer to peer transaction scenario.

The blocks may be connected to one another through various linkages, for example, each linkage may be formed based on a hash computed from part or all of a previous block or a portion thereof (e.g. VIN). For example, as shown in FIG. 2, Block 1 202 may be the initial block, and Block 2 204 may be connected to Block 1 202 and include a hash computed from Block 1 202. There may be various versions of blocks, for example, Block 2' 204' and Block 2" 204", which may be updated and/or modified versions of vehicle or transaction information stored in Block 2 204. Other implementations, topologies and/or arrangements may be provided, and the above is an illustrative example.

The example blockchain may have more, less, and/or different blocks. Blocks can be inserted, deleted, updated, modified, transformed, etc., over the course of time. The example blockchain may include one or more vehicle records. Block linkages may also be between two or more blocks. For example, in some embodiments, blocks contain linkages to a single prior block, two prior blocks, and/or all prior blocks.

Authorized entities 102, 104, 106, 108, 110, and 112 (e.g. insurance companies, collision centres, authorized service centres, law enforcement) can be granted permission attributes or access to write new blocks to the blockchain using the vehicle record processor 302. Authorized entities 102, 104, 106, 108, 110, and 112 update vehicle records with different vehicle related transactions and events. For example, a new block can indicate that the vehicle has been serviced, that the vehicle was involved in an accident, or possibly other events, such as that the vehicle was reported stolen. Access to write new blocks for a vehicle record can be restricted to those trusted authorized entities 102, 104, 106, 108, 110, and 112. An authorized entity 102, 104, 106, 108, 110, and 112 can be verified before writing new blocks for a vehicle record. When an entity 102, 104, 106, 108, 110, and 112 writes a block to an existing blockchain, the owner may be notified by way of a notification message, such as an email, text, or through an application specific to the platform.

In some embodiments, if an authorized entity 102, 104, 106, 108, 110, and 112 wishes to write information about a vehicle that has not yet been registered to the platform (e.g. no existing blocks for its vehicle record), the authorized entity 102, 104, 106, 108, 110, and 112 can still create the initial block for a vehicle record for the vehicle using the vehicle record processor 302. The platform 300 can be configured to send a notification message to the vehicle owner using contact data known to the authorized party that created the initial block or otherwise known to the platform. In some embodiments, a verification or approval response is required from the owner (via the platform 300 or an interface unit 310) before the initial block can be created by another authorized entity 102, 104, 106, 108, 110, and 112. The notification message can invite the owner to register with the platform. If no owner contact information is available to the authorized entity 102, 104, 106, 108, 110, and 112, the platform may notify the manufacturer or dealership where the car was sold, so that the manufacturer or dealership may then notify the vehicle owner.

A vehicle record can track service and accident history for the vehicle linked to the VIN. The service and accident history is recorded using blocks and each block includes the VIN identifying the vehicle. The VIN connects blocks for the vehicle record. A vehicle record can be dynamically compiled by identifying and aggregating all blocks with the VIN uniquely identifying the particular vehicle. The owner of the vehicle and particular authorized entities (e.g. insurance company) are able to view the complete vehicle history tracked by the vehicle record by way of reports and visualizations generated by an interface unit 310. The information for the vehicle (and transaction relating to the vehicle) can be stored on different blocks and the interface unit 310 is able to retrieve vehicle information from all of the blocks making up the vehicle record, and present it in a readable manner. The interface unit 310 may provide a perspective or visualization of data that does not require knowledge of the technical backend of blocks or blockchains. In some embodiments, unauthorized users will not be able to retrieve information on other cars, but might be able to query the blockchain for a VIN to see if the VIN is registered with the ledger or not. The owner may be notified when someone has queried the vehicle record.

Service and accident history information is valuable when selling used cars. A prospective buyer may send a request to the owner, or be granted permission by the owner without sending the request, to access and view the blocks defining the vehicle record (or a portion thereof) for the vehicle. When a request is made using the interface unit 310 to the platform 300, the request may be sent to the owner and the request can be viewable by the owner using another interface unit 310. The owner may approve or deny the request using the interface unit 310 (e.g. clicking "OK" or whatever other indication is given to grant the requested access). Information about the party making the request may also be provided, including optional information on how the owner may contact the requester. For example, the owner may want to verify more information about the requester prior to granting access. The buyer may then be able to read all of the information available on the vehicle record, trusting that it has not been manipulated by the owner, as blocks to the blockchain might not be deleted or modified. The access granted may be time-limited, or may be for a one-time-only access. If the vehicle is sold, ownership information may be updated by the seller as a new block for the vehicle record to reflect the new owner. The new owner may be notified when that has occurred. In some embodiments, the old owner will no longer be able to view the vehicle information. A block of the vehicle record may include a smart contract for the vehicle transaction so that ownership is transferred only when certain conditions are met (e.g. money received by seller from purchaser).

Information in the blockchain for the vehicle record may need to be updated, such as for example due to errors entering vehicle information, or conflicts in information between authorized parties. In some embodiments, the platform provides a correction mechanism for correcting information in the blockchain for the vehicle record. If an authorized entity 102, 104, 106, 108, 110, and 112 wishes to correct information in a block that the authorized entity 102, 104, 106, 108, 110, and 112 created, it may create a modification block, which references the prior block and indicates what data should be updated and how. The modification block can also include a reason for the update or correction.

When retrieving the vehicle record by way of the interface unit 310, the correction may be identified in the form of an indicator showing that a particular piece of information was updated. The update history of that information can then be viewed, if it is not shown already in the initial view. In the case of a conflict between information (e.g. insurance company and collision centre both updating information about the same accident but the information does not match), notifications may be sent to both parties. The notifications can highlight discrepancies, and request that authorized entities 102, 104, 106, 108, 110, and 112 agree to a correction or other resolution to the conflicting information. The interface unit 310 may automatically generate forms to provide information to the authorized entities 102, 104, 106, 108, 110, and 112 and receive information from the authorized entities 102, 104, 106, 108, 110, and 112. Once the conflict is resolved, a new block may be written to the blockchain for the vehicle record with information for the resolution. The resolution may be a correction of previously entered information on another block as well. The interface unit 310 can generate a form with standardized data entry fields to allow for these automated conflict checks when entering new blocks to the vehicle record.

A manufacturer (e.g. as an authorized entity 102, 104, 106, 108, 110, and 112) can record a block using a vehicle record node 300 to register newly manufactured cars prior to delivering to dealerships. The initial car dealer (e.g. as an authorized entity 102, 104, 106, 108, 110, and 112) can also be the first party to register vehicles on the platform 300. The first owner or another subsequent owner (e.g. as an authorized entity 102, 104, 106, 108, 110, and 112) can also register vehicles on the platform 300 (if not already registered by the manufacturer or dealership or other previous owner). A prospective buyer may be interested in a dealer registering or creating a vehicle record for any demonstration vehicles used for test drives, for example. The vehicle record information can be entered using the interface unit 310 in some embodiments.

New vehicles may be registered on the platform but older vehicles might not have an existing vehicle record. The existence of a vehicle record on the platform 300 for a vehicle may provide a buyer with more confidence in the state of the vehicle, and may encourage the buyer to pay more for the vehicle as compared to a vehicle that has no information available through the platform 300. The existence of a service history for a vehicle as part of its vehicle record can suggest that the vehicle was well maintained.

In some embodiments, the platform 300 can generate the recommended price for a vehicle using information stored in vehicle records and third party databases. The platform 300 can also connect with a database of historical used car prices and related information to use as a baseline for a price recommendation. When buying or selling a used vehicle, the platform 300 may be able to generate a recommended price or price range for the vehicle. The platform 300 can generate the recommended price based on the vehicle service and accident history, remaining warranty, mileage, make, model, and information from the sale history database. This information may be available to either the seller or the buyer, once they are granted access to view information from the vehicle record. The owner may have to grant access to a third party website or database for linking car pricing information with the platform.

To avoid owners registering their vehicles and entering fraudulent or inaccurate service histories, in some embodiments, only authorized service centres or devices may be permitted to enter service information as part of the blocks of a vehicle record. A block for a vehicle record can have a data attribute identifying the creator or source of the block (e.g. as an authorized entity 102, 104, 106, 108, 110, and 112) to verify the accuracy of the information. Service centres (like other authorized entities 102, 104, 106, 108, 110, and 112) can execute a registration process to be granted access to write blocks to the platform to update vehicle records with service information. In some examples, the write ability for service centres is limited. For example, service centres authorized for working on specific makes of vehicles can also have their write access limited to vehicles of that make only. An example table of read and write privileges is provided at FIG. 13.

The interface unit 310 can be implemented using a mobile application or desktop application, for example. Information from third party databases can be used to update or create blocks for vehicle records using the interface unit 310. For example, personal property security agreement (PPSA) information relating to vehicles can be registered with the platform and viewed using the interface. Vehicle warranty information can also be tracked, indicating what coverage remains for what parts of the vehicle. Information as to whether the vehicle was previously leased or owned, and for how many years, could also be tracked as blocks of vehicle records.

Embodiments described herein relate to vehicle records for tracking vehicle related information. Embodiments described herein can be applied to different vehicle types (e.g. cars, planes, boats, etc.) or other kinds of property as well.

Embodiments described herein can be extended to cover driver's license information, or other government licensing records. Embodiments described herein can be extended to track a person's credit history, for example.

Embodiments described herein enable ownership and car history to be captured from multiple authorized entities 102, 104, 106, 108, 110, and 112. This may protect subsequent owners and provide a dispute resolution tool. Embodiments may provide fraud prevention (at the time of or before sale or other transfer of ownership). Embodiments use a distributed system with the embedded trust of blockchain technologies. The blocks for the vehicle record cannot be altered so trust is built into the structure for the records.

The vehicle record blocks can include smart contracts built around the vehicle asset (e.g., car). The contract provides a history record for the vehicle and a mechanism to automate contractual terms, conditions, and so on. New blocks can record subsequent transfers of ownership for the vehicle. If the vehicle is used as collateral for financing then the smart contract can be modified for third party rights or claims. The vehicle record can provide a more accurate view of credit and rates depending on risks related to the vehicle history. Insurance claim records can be recorded in association with the vehicle record. The vehicle record can in real-time (or near real-time) be used to resolve discrepancies. The smart contract can flag inconsistencies and resolve the inconsistencies using protocol rules. In some embodiments, the manufacturer creates the first block (contract) for the vehicle record and enters the VIN. The-registration may only be available to the manufacturer, for example. A sale of the vehicle may trigger different permission attributes. Vehicle transactions can be recorded if the consideration is received or another condition of the contract is met. The vehicle record may include blocks that import vehicle history from third party data stores and link to the vehicle by VIN. A private key can unlock additional data (e.g. contents of a smart contract). The interface unit 310 can access a history report and check ownership status. Service history can also be recorded as blocks in the vehicle record.

The vehicle itself may be programmed to report servicing requests (e.g. service due, engine light, diagnostic tool reading) or other vehicle history events and create blocks. The vehicle (having an integrated device as a node 300) is an example of an authorized entity 102, 104, 106, 108, 110, and 112.

The vehicle record can be updated in real-time so that any recall information is pulled from a third party database and is up to date. For example, a recall notification on the vehicle can trigger an alert that the vehicle must be serviced and fixed. A block can record the recall notification and link to the vehicle record using the VIN. The electronic vehicle record is tied to the VIN so the information can be collected as a smart contract. Accident history often gets reported to insurance companies and they can update the blockchain using a vehicle record node 300.

The interface unit 310 shares the vehicle data and reports with third parties (e.g. insurance companies, nodes 300). An owner may not control all information that can be entered as part of the vehicle record. In some embodiments, the owner can approve the transfer of ownership but may not be able to approve all blocks recorded as part of the vehicle record. For example, collision centres can add accident events to the vehicle records.

The ledger, through its distribution among multiple entities 102, 104, 106, 108, 110, and 112 and resulting decentralized control logic, may be less vulnerable to tampering than some other non-blockchain implementations (e.g., transaction records stored only at a single organization's computing systems). Further, the additional metadata stored in the blockchain entries may also be utilized to increase the efficiency of various operations being conducted in relation to the entries, such as validation, updating, analysis, etc. Various business rules may be applied, and activities may include, for example, business rule definition, business rule execution, business rule management, and business rule monitoring, etc.

In this example, logic that may be utilized to increase the blockchain's resilience to tampering may include "majority consensus rules", where a validation may be based on the integrity of a "longest" blockchain; cross-validation by multiple nodes to authorize an activity to modify the blockchain; using suitable encryption and cryptographic techniques (e.g., public/private key pairs, hashing, "proof of work" generation); among others. For example, if a new "block" being proposed by one of the entities does not conform to one or more rules and/or requirements, the block may be rejected and/or subject to further scrutiny before it can be accepted and properly inserted into the blockchain.

In some embodiments, the distributed ledger is utilized to track vehicle related contracts and/or business agreements through a document or contract lifecycle. The distributed ledger (e.g., implemented using blockchains) writes various versioning information, content information, clause-specific information, etc. The node 300 implements a distributed ledger to capture vehicle related data from one or more (e.g., all) clauses of a variety of types of business agreements/contracts using a high-level domain specific language ("DSL"). The platform converts contracts into scripts for execution. Among other information, the version of the contract that is described in the DSL may be written to a blockchain distributed ledger.

By using a blockchain distributed ledger, each party may be able to rely on the DSL-expressed contract to be tamper resistant (and in some embodiments, tamper-proof). A party may be permitted to access the contract stored on the ledger, and any changes made to the contract may be reflected with a new entry to the ledger. Previous versions of the contract may be maintained on the ledger, and may either link to or be linked from later versions of the contact. The links may take the form of a hashed key or reference as in other blockchain implementations. Auditing contracts may be possible using this structure as all events persist in the blockchain distributed ledger. Changes may include changes to fees or other terms, or terminating a contract. Agreements/contracts that are translated to the DSL and stored in this manner are not to be restricted to any particular type.

By expressing the contract in the DSL, it may be possible to automate various actions based on the DSL-expressed contract and/or the records stored on the blockchain distributed ledger. For example, once a condition from the contract is satisfied (e.g., a date/time is reached, or the price of an object or asset has passed a particular threshold), one or more computer servers hosting or interfacing with the ledger may trigger an action. Actions may include initiating, modifying or cancelling a financial transaction, triggering another condition in the same or another DSL-expressed contract, or generally enforcing any one of a variety of legal obligations as defined by the contract. When a DSL-expressed contract is modified, such changes may also trigger notifications to the parties.

The blockchain may be operated by one financial institution, or a group of financial institutions, or other authorized entities 102, 104, 106, 108, 110, and 112 such as collision centres, insurance companies, authorized service centres, law enforcement, and so on. Each participating entity may operate as a node in the distributed network and may maintain a full copy of the ledger to be synchronized with the other entities when any change is proposed or made. By restricting the ledger to only particular entities 102, 104, 106, 108, 110, and 112 instead of to anyone with a computer (e.g., in distributed ledgers used for Bitcoins or other cryptocurrencies), clients may be more likely to trust that the entities will maintain the integrity and security of all data stored on the ledger behind a firewall.

A potential advantage to limiting the participating entities to authorized entities 102, 104, 106, 108, 110, and 112 (or another small group of entities such as mortgage companies, regulators, satellite offices) is that the number of nodes in the distributed network may be reduced (e.g., restricted, limited) in comparison to publicly distributed (or accessible) ledgers, and the financial institutions themselves may also be inherently more trustworthy than any number of unknown third parties. Accordingly, any consensus process, where different nodes on the distributed network must agree on any changes made to the ledger, may be simplified and overall performance of the ledger (e.g., transaction speed) may be increased over public distributed ledgers. For example, a more rigorous consensus process may be applied in view of common standards enforced across the entities, or the ledger may be constructed and configured such that greater efficiencies may be obtained during access, traversal, and modification, etc. In some embodiments, the ledger, in an example blockchain distributed ledger implementation, may be adapted such that the linkages between various "blocks" are designed to facilitate access and/or traversal of the blockchain in view of operations that may be implemented using, at least in part, information stored in the blockchain.

Figure 5:
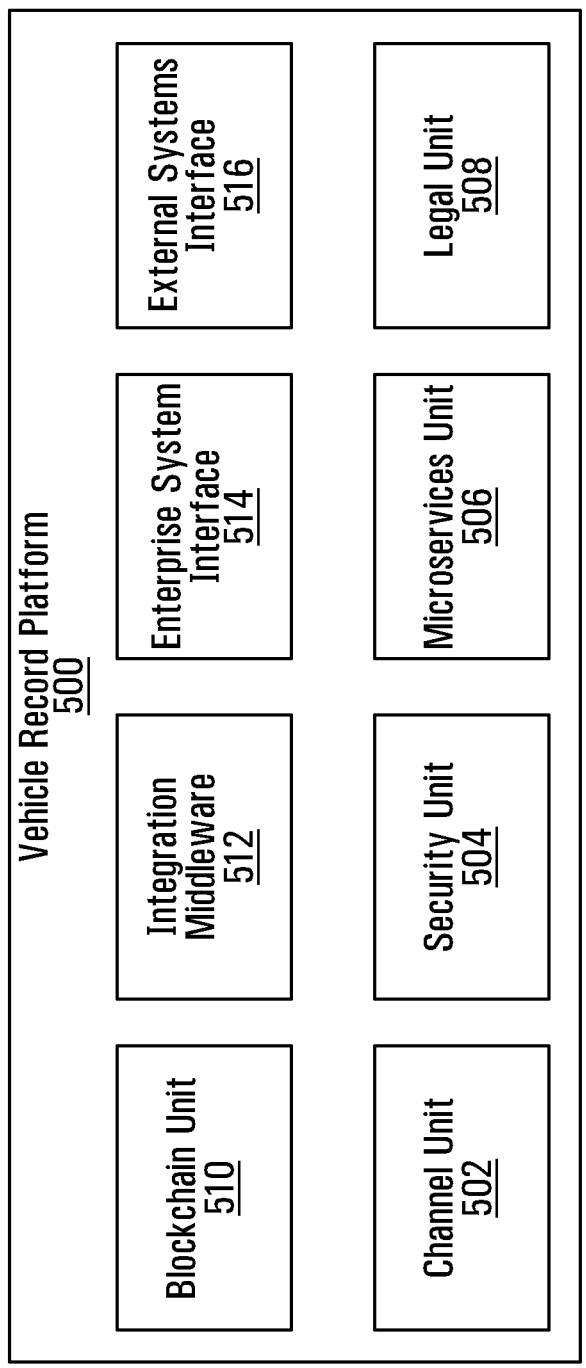
FIG. 5 is a schematic diagram of another electronic blockchain vehicle record platform according to some embodiments.

FIG. 5 is a diagram of a vehicle record platform 500 according to some embodiments. The vehicle record platform 500 can connect to or be implemented by vehicle record nodes 300, for example.

The vehicle record platform 500 includes a channel unit 502, security unit 504, micro-services unit 506, legal unit 508, block chain unit 510, integration middleware 512, enterprise system interface 514, and external system interface 516, for example. The vehicle record platform 500 can implement an auto financing distributed ledger and block chain infrastructure to create a safe and secure digital contracts system for sellers and buyers interested in forming a legally binding agreement to privately purchase a vehicle. The vehicle record platform 500 can build a system for client transportation needs. The channel unit 502 can connect to one or more interfaces for different devices operated by stakeholders. The channel unit 502 can also integrate with the device at the vehicle. The channel unit 52 can include different types of interfaces such as a mobile interface. The security unit 504 can implement authentication, identity management, permissions and audit logging for example. The micro-services unit 506 can provide different services for buyers, sellers and financial institutions. Example services include a vehicle marketplace and a vehicle service history. The legal unit 508 and block chain unit 510 implement smart contracts and write blocks to the distributed ledger. The integration middleware 512 can implement ledger integration gateways, payment services, and data analytics. The enterprise system interface 514 can integrate client profiles, payments, security, and other components with different enterprise systems. The external system interface 516 can connect to different vehicle record nodes 300 for different stakeholders in order to read and write to the distributed ledger.

The vehicle record platform 500 generates a distributed ledger with a plurality of nodes, for example. The distributed ledger has blocks. A block for a vehicle record includes a VIN, vehicle data, a timestamp indicating when the block was created, a hash reference for the ledger, and so on.

Vehicle record platform 500 has a micro-services unit 506 that can provide distributed applications to generate a vehicle listing of a vehicle record of a set of blocks from the ledger. Each block of the set of blocks has the same VIN. The vehicle record can have an initial block of a vehicle registration, ownership attributes, and permission attributes for the vehicle record.

The micro-services unit 506 can provide distributed applications that can be configured to receive a bid for the vehicle listing from a buyer, transmit a notification of the bid to a seller, receive an acceptance of the bid from the seller, and so on. The legal unit 508 can be configured to generate a smart contract for the vehicle listing, the smart contract including a buyer electronic signature, a seller electronic signature, and transaction terms. The legal unit 508 can be configured to determine that the transaction terms are satisfied and releasing payment, and record another block on the distributed ledger for the transaction, the other block comprising the same vehicle identification number, buyer identification, seller identification, and the smart contract.

The security unit 504 can be configured to verify the seller by receiving seller credentials prior to transmitting the notification, and verify the buyer by receiving buyer credentials and providing access to the vehicle record. The security unit 504 can be configured to verify the seller by receiving seller credentials and compare the seller credentials to the ownership attributes. The security 504 can be configured to verify the buyer by receiving buyer credentials, compare the buyer credentials to the permission attributes, and provide access to the vehicle record.

The integration middleware 512 can be configured to receive a vehicle registration request, verify the vehicle registration request, and generate an initial block for the vehicle record. The initial block can include vehicle registration, ownership attributes, permission attributes for the vehicle record, and the same vehicle identification number.

The micro-services unit 506 can provide distributed applications that can be configured to receive a vehicle service event identifying the same vehicle identification number, and generate an additional block for the vehicle record. The additional block can include repair attributes and the same vehicle identification number. The application can be configured to receive a vehicle accident event identifying the same vehicle identification number, and generate an additional block for the vehicle record. The additional block has accident attributes and the same vehicle identification number. The application can be configured to receive a manufacturer recall event identifying the same vehicle identification number and generate an additional block for the vehicle record. The additional block can include recall attributes and the same vehicle identification number.

The applications can be configured to receive a seller registration request, verify the seller registration request, and generate an additional block for the vehicle record, the additional block comprising seller attributes and the same vehicle identification number. The applications can be configured to receive a buyer registration request, verify the buyer registration request, and generate an additional block for the vehicle record, the additional block comprising buyer attributes and the same vehicle identification number.

The applications can be configured to receive a credit risk request for the buyer, receive a credit score for the buyer, and generate an additional block for the vehicle record, the additional block comprising buyer attributes, the credit score, and the same vehicle identification number. The applications can be configured to receive a vehicle search request with a set of parameters and identify the vehicle record based on the vehicle search request by comparing the set of parameters to the vehicle data of the vehicle record.

The vehicle record platform 500 has a block chain unit 510 to generate blocks for the distributed ledger. The distributed ledger can support the peer to peer vehicle marketplace, in some embodiments. The legal unit 508 can interact with the distributed ledger to validate contract negotiation protocol and transaction security. The vehicle record platform 500 provides a private or public block chain infrastructure with security, identity, and management services. The peer to peer vehicle marketplace can include a vehicle inventory management API, buyer or seller onboarding API, bids and listings management API, vehicle contract lifecycle API, and so on. The distributed ledger generates vehicle records to provide vehicle identification, warranty information, authentication management, contract management, electronic signatures, bid management, and so on. The legal unit 508 can enable payments for finalizing contracts. The legal unit 508 can interact with the enterprise system interface 514 or external system interface 516 for payment processing and transfer. The legal unit 508 can provide a legal contract repository and management applications. The legal unit 508 can provide identity services integration and a client matching engine. The legal unit fibroid can integrate with payment services and can provide a mobile application user interface flow for the buyer and seller. There can be mobile application integration with vehicle APIs. The distributed ledger enables registration of vehicle ownership using blocks for the vehicle record.

The vehicle record platform 500 enables off chain payments and on chain payments. The vehicle record platform 500 enables payment lifecycle using the distributed ledger. The vehicle record platform 500 can implement a bid process and listing matching process. The vehicle record platform 500 can provide notifications for buyers and sellers of bids and transactions. The micro-services unit 506 can include an application to implement an analytics engine for insight generation. The vehicle record platform 500 can enable financial institution or counterparty onboarding to the distributed ledger network. The vehicle record platform 500 can provide on chain payment protocol and lifecycle along with the bid and list matching engine. The vehicle record platform 500 can include applications for fraud prevention, AML services and payment integration. The vehicle record platform 500 can provide data analytics and marketing insights. The vehicle record platform 500 can include a notification engine to transmit notifications by way of a channel unit 502. The micro-services unit 506 can include applications for recall and repair management. The vehicle record platform 500 can include services or dispute resolutions along with APIs for recalls, repairs, collision events and vehicle servicing. The vehicle record platform 500 can include integration middleware 512 for onboarding of third party data. The integration middleware 512 can provide dispute resolution services, manufacturer recall APIs, vehicle repair APIs, collision APIs, servicing APIs, and entity onboarding. The vehicle record platform 500 can provide recall management, repair condition update, service confirmation, quality checks, and so on.

The vehicle record platform 500 can provide a vehicle history registry along with the loan and insurance management system. The vehicle record platform 500 can validate IoT vehicles by way of a channel unit 502 to automatically implement VIN registration and event consolidation. The vehicle record platform 500 can process loan applications and insurance applications. The vehicle record platform 500 can enable vehicle self registration using IoT devices. The vehicle record platform 500 can provide consolidated vehicle history event APIs, enhanced vehicle history analytics, credit rescoring APIs, loan application integration, insurance application integration, and so on. The vehicle record platform 500 can provide vehicle identification, registration ownership, insurance coverage, lean management, and so on.

The vehicle record platform 500 can provide a marketplace capability whereby a buyer and the seller transact in a peer to peer marketplace to ensure the buyer gets the car in a certain condition based on its vehicle history, that the car is registered in the name of the buyer and that the seller received payment. The vehicle record platform 500 can implement accident reporting by creating blocks on the distributed ledger in response to accident events. The vehicle record can identify accident history and collision reports. An entity can report vehicle accident events that can be recalled during the buying or selling process. This can provide the ability to build a centralized repository of a vehicle's history including accidents. This can provide accurate information regarding the vehicle's value for financing purposes of considering condition, price, repairs, recalls, and so on. The vehicle record platform 500 can record recall information to allow a manufacturer to push recalls digitally on the basis of an event directly to the owner of the car by way of the distributed ledger. This can provide increased visibility of vital recall information to owners. Manufacturers are required to notify the owner of recalls. If the owner fails to read the media notice or is in touch with the dealer or manufacturer there is a possibility that the owner main miss a recall. The distributed ledger can automatically notify on owner by way of the distributed ledger.

The vehicle record platform 500 can include a license sticker renewal process. A license plate sticker renewal request can be received digitally through the distributed ledger which can provide notice to a government node. This can provide digital renewal notice messaging to owners. Renewal notices "on-chain" or on the distributed ledger may provide more timely renewals and payments.

Some approaches can lack trusted agreements between a buyer and a seller of a used vehicle to transact in a safe and secure environment. Private buyers and sellers may not engage in a formal contractual agreement to buy or sell the used vehicle which results in some degree of uncertainty regarding the transaction. There can be a high cost to buyers and sellers to obtain a complete history of a vehicle from a third party vehicle history reporting service and even then the history may be incomplete. There may be no guarantee of a secure financial transaction without the cost and inconvenience of obtaining a money order or certified check at an institution branch. There may be a lack of a complete vehicle history to identify a vehicle's value as it relates to prior accidents, repairs and recall history to aid buyers in making informed decisions. The vehicle record platform 500 can provide an improved solution and can include smart contracts to govern the terms of an agreement in a safe and secure manner, a centralized vehicle history registry of buyers and sellers to match specific needs using the distributed ledger, and an immutable record of the vehicles' history, for example.

The vehicle record platform 500 can provide a centralized repository to facilitate a peer-to-peer marketplace. A centralized vehicle repository based on a vehicle identification number or VIN may be used to showcase inventory. In addition, it can provide multiple stakeholders with vital information to assess value, condition and provide value-added services. The vehicle record platform 500 can provide a complete history of vehicle changes to assess value in condition. Throughout the vehicle life cycle, key vehicle information can be updated to add value to several downstream buyers, sellers and other stakeholders. The vehicle record platform 500 can also be used for insurance or financing purposes. The vehicle record platform 500 can create a peer-to-peer marketplace using distributed ledger and smart contract technology to enable a buyer and seller to enter into digital contractual relationships regarding a vehicle or other property.

The vehicle record platform 500 can provide a peer to peer used car marketplace which can allow buyers and sellers to conduct transactions in a safe and secure manner. The vehicle record platform 500 can provide a peer-to-peer marketplace to enhance client or vehicle buyer or seller value resulting in expanded opportunities to enhance the client experience. The approach is focused on a shift of client volume towards the private sale channel, as opposed to used car and new car dealers. The use of a distributed ledger may provide an infrastructure for branches and affiliates to facilitate the sale and purchase of cards within a peer to peer network. For example, there is a large used car market involving used car dealers, new car dealers and private sales that can be managed by the vehicle record platform 500.

Vehicle transactions have a reliance on third party information. If you are looking to buy a car and want to know its history you need to rely on third parties. Companies can collect information from Insurance Companies and Collison Centers to record accident history. There can be a lack of timely information. This information reported to known systems may not be instantaneous. Known approaches may have siloed Information. There can be an absence of a centralized repository which can also hold other information related to the car such as service records, warranty and recalls. The vehicle record platform 500 can provide a repository of update to date vehicle records. The vehicle record platform 500 can enable transactions to be conducted in a safe and secure manner to mitigate fraud.

Embodiments can provide an efficient system which reduces fraud, mediation fees, does not need a third party to act as trusted agent and allows trade to take place much faster. In case of theft, this can help to protect the owner's rights and resolve any disputes. An individual who owns the car or is looking to buy a car in the future may use the vehicle record platform 500. By automating the capturing of information from the various ecosystems, the vehicle record platform 500 can remove the reliance on third parties to maintain the data. For example once the car servicing is performed, the vehicle record platform 500 can integrate with a device in the car dashboard to update the ledger to keep the servicing history up to date.

The vehicle record platform 500 can facilitate automotive finance for consumers, dealers and manufacturers. Example embodiments may enable membership by moving upstream with retail customers and engagement throughout the ownership cycle to track vehicle history and provide discounts, for example embodiments can facilitate active sales generation for dealers and manufacturers. Embodiments can be used for vehicle sales by tracking data throughout the ownership cycle. Embodiments can provide a dealer portal to enable record keeping by dealers. Some embodiments may relate to different types of property for different commercial and retail platforms. Embodiments can provide a peer-to-peer marketplace for frictionless and hasslefree disposition of used vehicles and other property. Embodiments can provide lead generation programs that can be triggered by disposition to dealers or OEMs. Embodiments can provide branch infrastructure to facilitate transactions.

The vehicle record platform 500 can include a legal unit 508 to generate secure legally binding peer-to-peer contracts to purchase vehicles and other property. The vehicle record platform 500 can include a channel unit 502 to generate an interface application with vehicle inventory matched to clients. The channel unit 502 can interact with the legal unit 508 to create binding legal agreements. The micro-services unit 506 can enable safe and secure peer-to-peer transactions using financial institution systems. The vehicle record platform 500 can integrate with payment and backend servers. In some embodiments, the vehicle record platform 500 can record blocks for transactions and payments.

The vehicle record platform 500 can implement the following example process. The seller generates a contract and posts inventory to a Vehicle Repository. The vehicle posting can contain a picture(s) of the vehicle and key information about the vehicle's VIN, price, condition, mileage, features, description (make, model, trim), accident history, warranty information, and so on. The buyer reviews inventory and the vehicle record platform 500 can provide the ability for the buyer to 'shop' and 'add to cart' vehicle postings for review. The buyer can have access to the vehicle history data record. The buyer shops and bids on the contract. The vehicle record platform 500 can provide the ability for the buyer to 'shop' and 'add to cart' vehicle postings for review and bidding, as appropriate. The seller accepts or rejects bids. The vehicle record platform 500 can provide the seller with the ability to accept, reject or counter bids from the buyer. The buyer accepts the contract. The vehicle record platform 500 can provide the ability to finalize and 'seal' bids to bind the contract terms and conditions. The buyer sends payment which can be held in escrow. Payments may be sent and held in escrow to finalize a sale in person. The buyer sends the vehicle registration or keys. The buyer meets with the seller to exchange keys, signed vehicle ownership or information for government registration, for example. The vehicle record platform 500 can release funds in escrow to the client.

The legal unit 508 can manage smart contracts. Smart contracts can include code for different provisions such as: Buyer or Seller Information (e.g. Buyer and Seller Name and License ID); Vehicle Information (e.g. VIN, history information); Legal Terms and Conditions (e.g. terms that govern the agreement); Payment Terms (e.g. agreed to purchase price of the vehicle); Vehicle Ownership Acknowledgement (e.g. Seller acknowledgement to provide signed ownership); Vehicle Key Acknowledgement (e.g. Seller acknowledgement to provide vehicle keys). The vehicle record platform 500 can provide the ability for: a seller to create/modify/delete a contract; a buyer to review and bid on multiple contracts; a seller to reject/accept bid(s); an audit of the entire transaction history, and so on.

Vehicle type can include a vehicle sold at a dealership and also by private sale. Vehicles can be both business or personal vehicles. Vehicles can include farm equipment, buses, and so on. The vehicle record can identify loan financing or insurance coverage. Vehicle information may include warranty coverage from dealers or financial institution products such as rust proofing, bumper-to-bumper, modification, retrofit, and so on. The vehicle record platform 500 can record vehicle information with global, national, or regional scope. The vehicle record platform 500 can integrate with government systems, automobile dealers, manufacturers, financial institution platforms, repair centres, law enforcement agencies, mechanics, and so on.

The vehicle record node 300 may be a distributed and decentralized ledger platform, providing trusted and permissioned access to an electronic Vehicle Marketplace. The vehicle record node 300 facilitates the vehicle transactions with offers matching, buy-sell operations through an event driven architecture, multi-signature transactions and smart contracts.

As noted, the vehicle identification number (VIN) may be used by the vehicle record node 300 to build a centralized repository to facilitate P2P transactions for vehicles. The vehicle record node 300 may be a distributed and decentralized ledger platform implemented using blockchain technology.

The vehicle record platform 500 can provide a distributed solution with a decentralized, peer-to-peer, secured network, providing ledger nodes to the trading partners banks (issuing, advising, confirming etc.) in a closed loop, permissioned environment. The vehicle record platform 500 can provide business domain services with distributed applications leveraging Event Driven designs and providing clear separation of concerns between business logic and technology concerns (security, logging, etc.), to control application complexity and to facilitate ongoing maintainability. The vehicle record platform 500 can provide modularized distributed applications that allow explicit composition of the contracts operations. They can provide a delineation between past events (transactions) and future events (contracts). The vehicle record platform 500 can provide data privacy and methods for securing data and ensure cryptographic protection across network participants. This can guarantee that each party's data is read and write-protected from other network participants, so they will not a gain competitive advantage and for regulatory purposes. The vehicle record platform 500 can provide data integrity with the ability to restore ledger data to the last known good, in case of ledger corruption. The vehicle record platform 500 can have the ability to identify corrupted or fraudulent data records in real time and eliminate them from the ledger. The vehicle record platform 500 can have the ability to identify double spend attacks in the ledger and contain them accordingly. The vehicle record platform 500 can provide permission management for participants to differentiate between various parties/node roles in the network. The vehicle record platform 500 can provide resiliency with a fault tolerant platform, providing the ability to identify, efficiently recover from failures and reconstruct the system state from the past events. The vehicle record platform 500 can provide the ability to calculate the application's previous state, without impacting the platform performance and scalability. A node can recover from deadlocks, situations where it cannot accept requests, or if it times out. If requests arrive at a failed component, then the vehicle record platform 500 can ensure the requests continue to be processed, without being halted or delayed.

The vehicle record platform 500 can provide concurrency with the ability to handle concurrent process transactions without conflicts. The vehicle record platform 500 can provide reliability with timeouts and retries: If retries are implemented, then the vehicle record platform 500 can ensure that the same transaction is not processed/transmitted twice in the ledger. A timeout can hide the fact that the transaction was processed, but no ACK/NACK was sent back to the sender, for example. The vehicle record platform 500 can provide scalability such that the vehicle record platform 500 scales up or down under load, responding to various request rates. The vehicle record platform 500 can keep network traffic within limits, to avoid higher network load and impact on performance (especially in the polling for payment status case). The vehicle record platform 500 can provide change management to implement effective change and upgrade management of the ledger and contracts data, to facilitate the backward and forward compatibility. The vehicle record platform 500 can provide real-time monitoring of the entire ledger, to ensure high availability, and ability to react and prevent system down-times.

FIGS. 7A, 7B, 7C, and 7D provide a system context diagram according to some embodiments. The vehicle record platform 500 connects to computing devices (e.g. vehicle IoT device 702, buyer device 704, seller device 706, dealership device 708, car service shop device 710, financing device 712) by way of channel access connections 714 to receive data for the distributed ledger. The vehicle record platform 500 receives and verifies the vehicle identification using smart vehicle assets, such as vehicle IoT devices 702. Sensor IoT enabled vehicle devices 702 may be able to transmit data and events related to its lifecycle to the vehicle record platform 500, such as VIN registration, transactions, and service events, to record the ownership change and other relevant events on the ledger. Channel access connections 714 can provide for contract management, electronic signatures, bid management, vehicle matching and insurance coverage. Applications for peer to peer marketplace interactions can be provided via online and mobile channels connections 714. Standalone APIs or SDKs can also be provided to enable integrations within third party systems in different channels of choice. These APIs can to be extensible and configurable to facilitate reusability across parties.

The vehicle record platform 500 can have different security tools including an authentication unit 716, an identity and fraud management unit 718, a permissions unit 720, and an audit logging unit 722. The security tools can manage a hierarchical model for party identities, allowing them to enroll, deactivate, and renew their credentials as required. A public and private key infrastructure can be used to maintain these identities, while being decentralized and not owned by any of the parties of the vehicle peer to peer network. The vehicle record platform 500 can integrate with identity providers. Each party can have well defined roles, with pre-defined business authorizations to allow them access to data or operations.

The vehicle record platform 500 has different micro-services or distributed applications such as a buyer and seller unit 724, a vehicle marketplace engine 726, a bank unit 728, a vehicle service and history unit 730, and so on. The micro-services or distributed applications can provide contract management, electronic signatures, bid management, vehicle matching, insurance coverage, registration ownership, recall management, repair condition, and service confirmation. Buyers and sellers can be provided with secure means to onboard data seamlessly into the vehicle record platform 500, manage their own preferences, upload vehicle information (e.g. images, proof of ownership, warranty documents etc.), view offers and accept them, and negotiate contracts. Payments can be fulfilled through the vehicle record platform 500 infrastructure, converting government backed currencies to a cryptocurrency, or the payments can be realized through the usual means, such as via the Swift network leveraging bank payments services. Banks can be part of this marketplace, and can provide loans for the potential buyers or insurance offers. Identifying the buyers to existing clients can be performed by leveraging the infrastructure. If the buyer is not a client, then the buyer and seller unit 724 can provide a registration interface to register the buyer on the marketplace, while executing AML and KYC verifications, for example. A modular design can allow integration with enterprise services to perform fraud checks, AML/KYC, credit risk scoring and so on for potential borrowers or an insured entity. The vehicle marketplace engine 726 can match automatically vehicle listings with potential offers, based on buyer preferences and pre-defined criteria. The role of escrow agent and clearing house can be filled by the underlying protocol based on the ledger and smart contracts, eliminating unnecessary costs, time, and third-party trust. The vehicle servicing unit 730 can be used for the interaction with the manufacturer (OEM), to receive events signaling car recalls or warranty changes. Collision and servicing centres can also be part of the vehicle record platform 500 and add vehicle repairs details, collision event details, as needed, to vehicle records. The vehicle record platform 500 includes a legal agreement layer with a document management unit 732.

Different block chain functions include a smart contracts layer 734, block chain contracts database 736, off chain contracts metadata 738, virtual machine 740, block chain ledger 742, block chain event database 750, and notification engine 752. The block chain ledger unit 742 includes a security unit 744, an accounting unit 746, and a networking unit 748. An integration middleware layer includes a block chain integration gateway 754, a payment services hub 756, and a data analytics engine 758. The notification engine 752 can alert sellers about potential matches and to act on potential offer. Alerts can be sent via SMS, email, or in app, depending on user preferences. The block chain ledger 742 can provide contract management, electronic signatures, bid management and registration ownership. The vehicle can be digitized (e.g. VIN) and managed as a smart asset within the block chain ledger 742. The value is negotiated and accepted through the matching and exchange engine. The smart contracts layer 734 can capture the contractual clauses, terms and conditions, for secure definition and execution of the contract between the parties. Multi signature transactions can be provided to ensure that the vehicle is kept in escrow until the payment is finalized and all required transaction signatures are collected. Smart contracts can have related states, digital signatures, and refer to the vehicle as smart asset reference data, which can be stored within block chain ledger 742. To avoid an increase of the ledger data size, the additional vehicle metadata and documentation can be stored securely off-chain, linking it through digital signatures and hashes. Transactions executed on the block chain ledger 742 can be broadcasted and accepted through the native consensus layer.

The block chain integration gateway 754 can provide for authentication management, fraud management, contract management, and electronic signatures. The block chain integration gateway 754 can leverage integration middleware to integrate with bank enterprise services, such as payments via PSH, client profile for client profile verification, matching, or for fraud prevention monitoring of the transaction legitimacy in real time.

The vehicle platform 500 can provide for network management and monitoring using an administrative application to monitor each node's activity, status, and broadcasting events. Nodes can be taken offline, resynchronized if their data is out of sync with the main ledger, and broadcast events as they receive them from their peers. An access control unit can manage permissions by node and entities enrolled in the network. A data analytics engine 758 can perform data mining on the vehicle events data store, buyer preferences, and provide recommendations based on needs, transaction patterns and similarity with other customers, for example.

Enterprise systems include a common client profile 760, common components 762, payments unit 764, fraud unit 766, reference data 768, and documents 770. External systems include a block chain private and permission network 772. The block chain private and permission network 772 includes a node 774 for an OEM, a node 776 for a financial institution, a node 778 for a registration agency, and a node 780 for a collision report centre. Accordingly, the vehicle record platform 500 includes security mechanisms, microservices and applications, legal tools, block chain function, integration middleware, enterprise systems, and external systems. The components of the system interact and exchange data to trigger the updates by vehicle record platform 500.

The vehicle record platform 500 generates a distributed ledger with a plurality of nodes 774, 776, 778, 780. A node 774, 776, 778, 780 can include a computing device to record blocks, for example. The distributed ledger has blocks. A block for a vehicle record includes a VIN, vehicle data, a timestamp indicating when the block was created, a hash reference for the ledger, and so on.

The vehicle record platform 500 has a vehicle marketplace engine 726 configured to generate a vehicle listing of a vehicle record of a set of blocks from the ledger. Each block of the set of blocks has the same VIN. The vehicle record can have an initial block of a vehicle registration, ownership attributes, and permission attributes for the vehicle record.

The buyer and seller application 724 is configured to: receive a bid for the vehicle listing from a buyer, transmit a notification of the bid to a seller, receive an acceptance of the bid from the seller, and so on. The smart contracts middleware layer 734 is configured to generate a smart contract for the vehicle listing, the smart contract including a buyer electronic signature, a seller electronic signature, and transaction terms. The integration middleware layer 754 is configured to determine that the transaction terms are satisfied and release payment, and record another block on the distributed ledger for the transaction, the other block comprising the same vehicle identification number, buyer identification, seller identification, and the smart contract.

The security layer can be configured to verify the seller by receiving seller credentials prior to transmitting the notification, and verify the buyer by receiving buyer credentials and providing access to the vehicle record. The security layer is configured to verify the seller by receiving seller credentials and compare the seller credentials to the ownership attributes. The security layer is configured to verify the buyer by receiving buyer credentials, compare the buyer credentials to the permission attributes, and provide access to the vehicle record.

The integration gateway 754 is configured to receive a vehicle registration request, verify the vehicle registration request, and generate an initial block for the vehicle record. The initial block can include vehicle registration, ownership attributes, permission attributes for the vehicle record, and the same vehicle identification number.

The vehicle history application 730 can be configured to receive a vehicle service event identifying the same vehicle identification number and generate an additional block for the vehicle record. The additional block can include repair attributes and the same vehicle identification number. The vehicle history application 730 can be configured to receive a vehicle accident event identifying the same vehicle identification number, generating an additional block for the vehicle record. The additional block has accident attributes and the same vehicle identification number. The vehicle history application 730 can be configured to receive a manufacturer recall event identifying the same vehicle identification number, generating an additional block for the vehicle record. The additional block can include recall attributes and the same vehicle identification number.

The buyer and seller application 724 can be configured to receive a seller registration request, verify the seller registration request, and generate an additional block for the vehicle record, the additional block comprising seller attributes, and the same vehicle identification number. The buyer and seller application 724 can be configured to receive a buyer registration request, verify the buyer registration request, and generate an additional block for the vehicle record, the additional block comprising buyer attributes, and the same vehicle identification number.

The buyer and seller application 724 can be configured to receive a credit risk request for the buyer, receive a credit score for the buyer, and generate an additional block for the vehicle record, the additional block comprising buyer attributes, the credit score, and the same vehicle identification number. The vehicle marketplace engine 726 is configured to receive a vehicle search request with a set of parameters and identify the vehicle record based on the vehicle search request by comparing the set of parameters to the vehicle data of the vehicle record.

Figure 8:
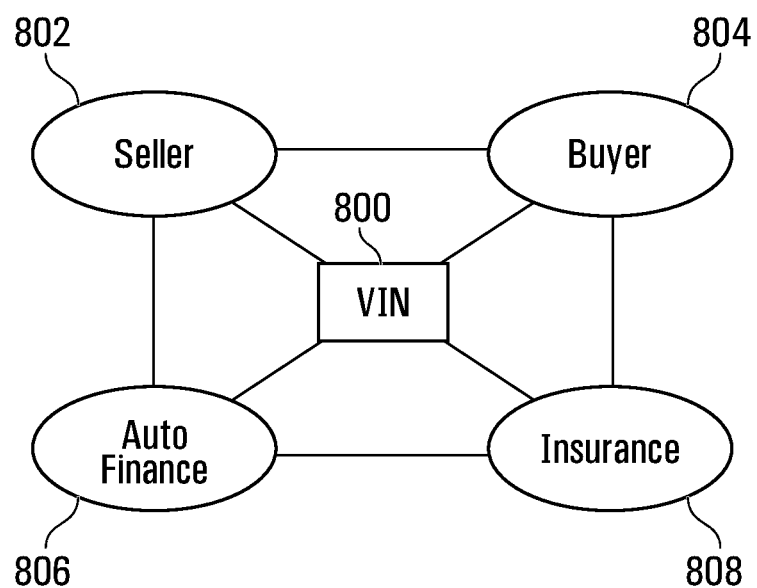
FIG. 8 is a diagram of entities interacting with a vehicle identification number.

FIG. 8 is a diagram of entities interacting with a VIN 800. Different entities can read and write data relating to a particular vehicle using the VIN 800. Example entities include a seller 802, buyer 804, auto finance institution 806, insurance 808, and so on.

Figure 9:
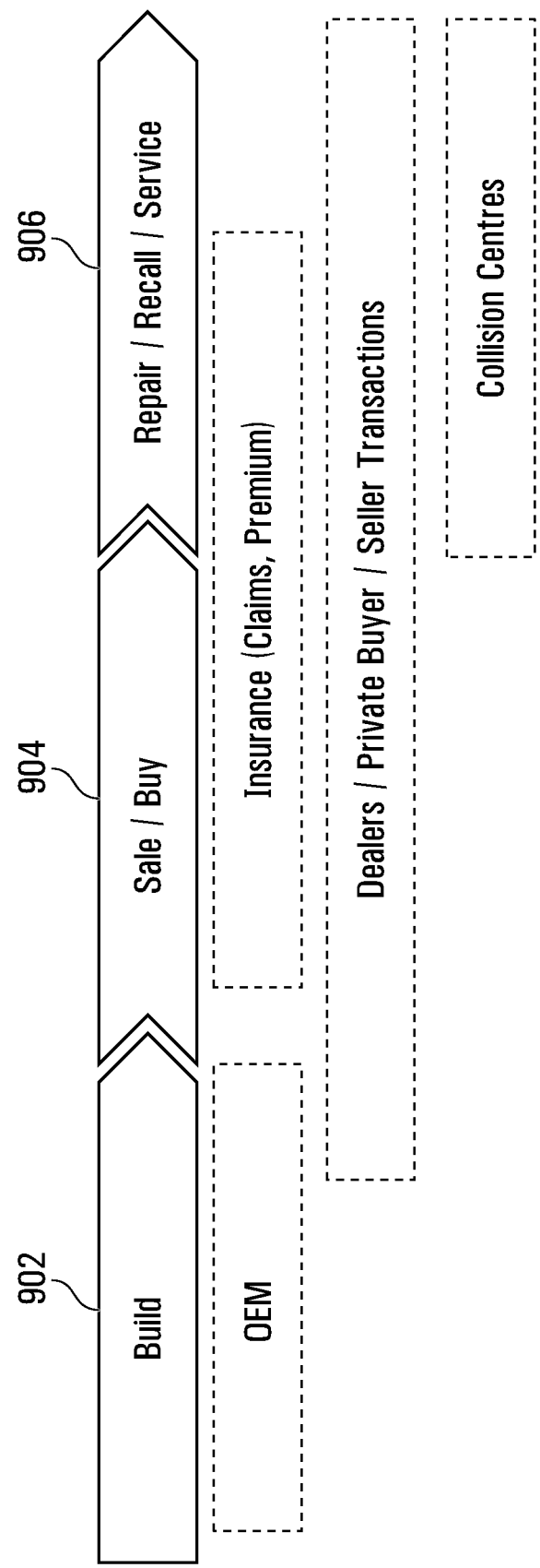
FIG. 9 is a diagram of a vehicle lifecycle.

FIG. 9 is a diagram of a vehicle lifecycle. Throughout the vehicle lifecycle, key vehicle information can be updated as blocks to the blockchain or distributed ledger to provide a comprehensive vehicle record. The lifecycle can include a build stage 902, a sale or by stage 904, and a repair or recall or service stage 906.

Figure 10:
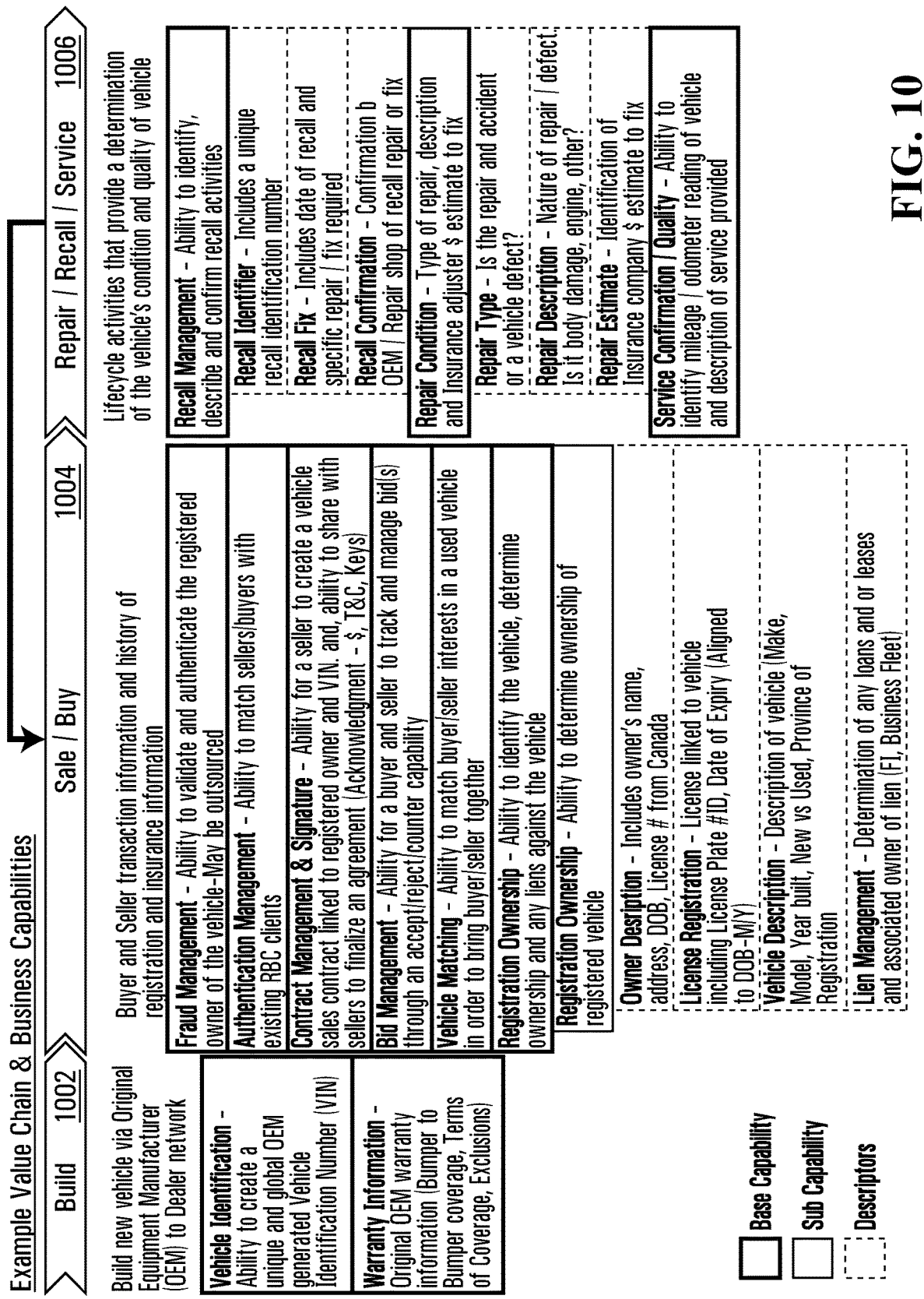
FIG. 10 is a diagram of a vehicle lifecycle and value chain.

FIG. 10 is a diagram of a vehicle lifecycle and value chain. At a build stage 1002, a new vehicle can be built at an original equipment manufacturer (OEM) and delivered to a dealer network. The vehicle record platform 500 can record vehicle information and warranty information. The vehicle record platform 500 implements vehicle identification with the ability to create a unique and global VIN. At a sale or buy stage 1004, the vehicle record platform 500 records buyer and seller transaction information at blocks and can generate a history of registration and insurance information. The vehicle record platform 500 can implement fraud management, authentication management, contract management and digital signatures, bid management, vehicle matching, registration ownership, and so on. The vehicle record platform 500 can implement registration ownership by way of an owner description, license registration, vehicle description, and lean management. At a repair, recall, or service stage 1006, the vehicle record platform 500 can record data for lifecycle activities to provide a determination of the vehicle's condition and quality. The vehicle record platform 500 can implement recall management, repair condition management, and in-service confirmation.

Figure 11:
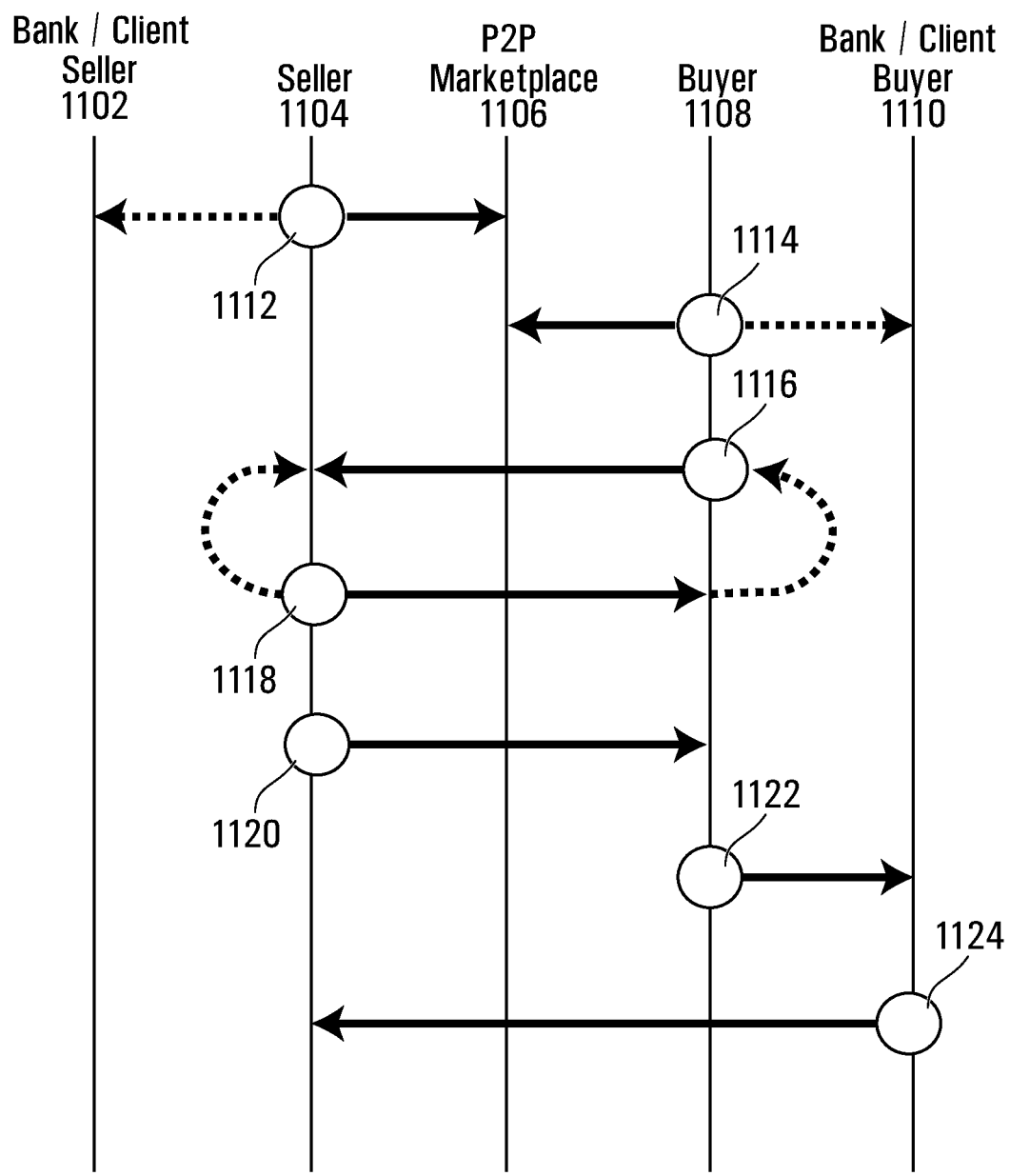
FIG. 11 is a workflow diagram of smart contract.

FIG. 11 is a workflow diagram of smart contract generation. The workflow includes a bank client seller 1102, a seller 1104, a peer to peer marketplace 1106, a buyer 1108, and a bank client buyer 1110. At 1112, a seller 1104 creates a vehicle listing and contract and posts the inventory record to the peer to peer marketplace 1106. The vehicle listing or record can be linked to a client profile. The vehicle listing or record can include a VIN, description, make, model, mileage, price, photos and so on. At 1114, the buyer 1108 reviews vehicle listings or records and selects a vehicle listing or record to review. The selection can be linked to a client profile. Multiple vehicle listings can be retained in a card for future viewing. At 1116, the buyer 1108 sends a notification to the seller 1104 to either ask a question, bid, counterfeit, or so on. At 1118, the seller 1104 receives a seller notification and can respond by accepting or rejecting the bid, counter bid, responding to questions, and so on. At 1120, the buyer 1108 and the seller 1104 continue to bid until an offer is accepted to finalize the transaction. Notification is sent congratulating the seller 1104 and the buyer 1108 on a successful transaction and can provide the following information as an acknowledgement or confirmation: a signature, terms and conditions governing the transaction. This can include legal terms and conditions, pickup information, signed ownership card, escrow fund directions, and so on. At 1122, the bank client buyer 1110 confirms funds are available and are to be held in escrow until the pickup date. Notification is sent to the seller 1104 the funds are held in escrow until the pickup date. At 1124, funds of the bank client buyer 1110 are released to the bank client seller 1102 on the pickup date. Notification is sent to confirm the release of the escrow funds prior to the release of the funds.

Figure 12A:
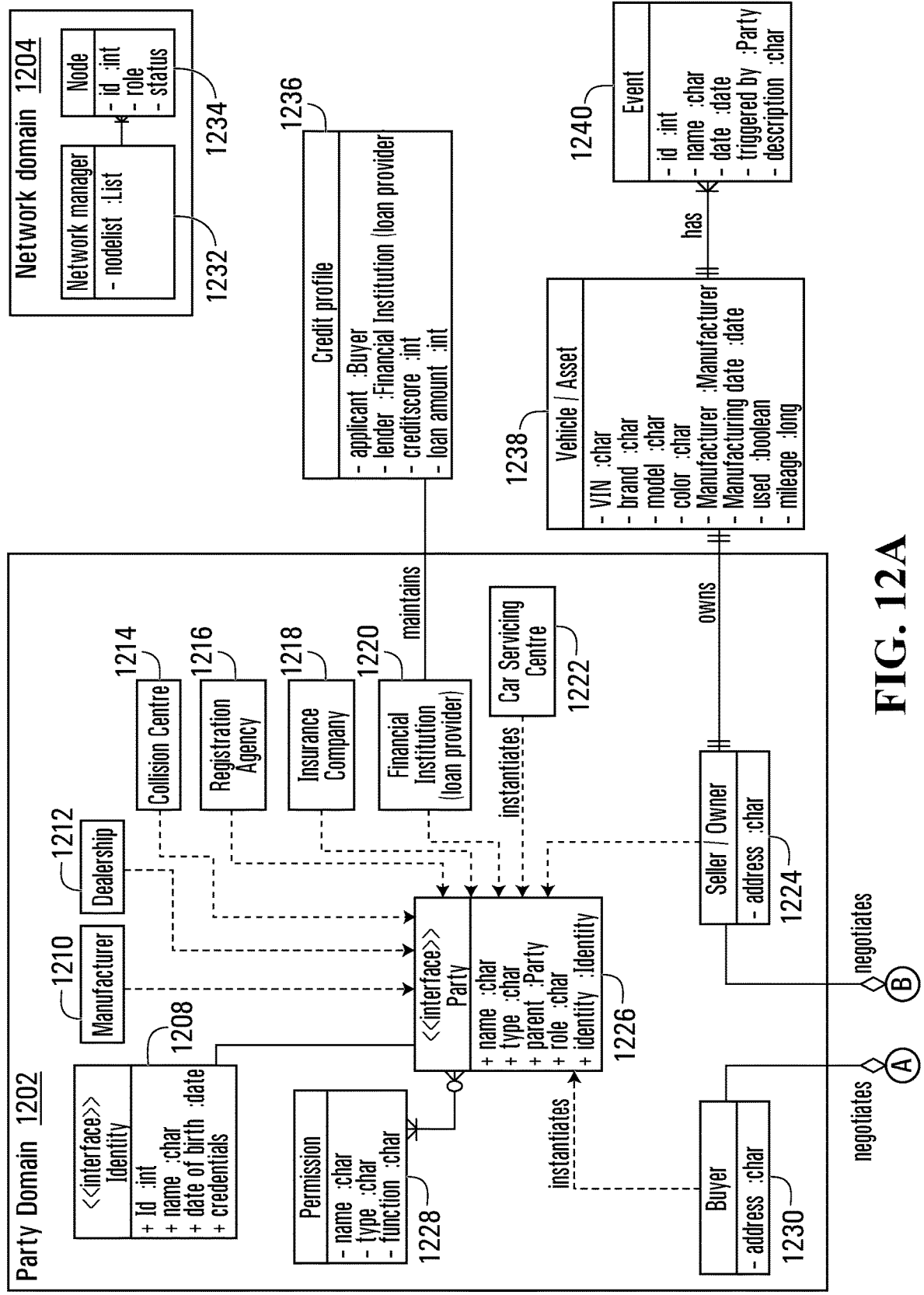
FIGS. 12A and 12B are data model diagrams according to some embodiments.
Figure 12B:
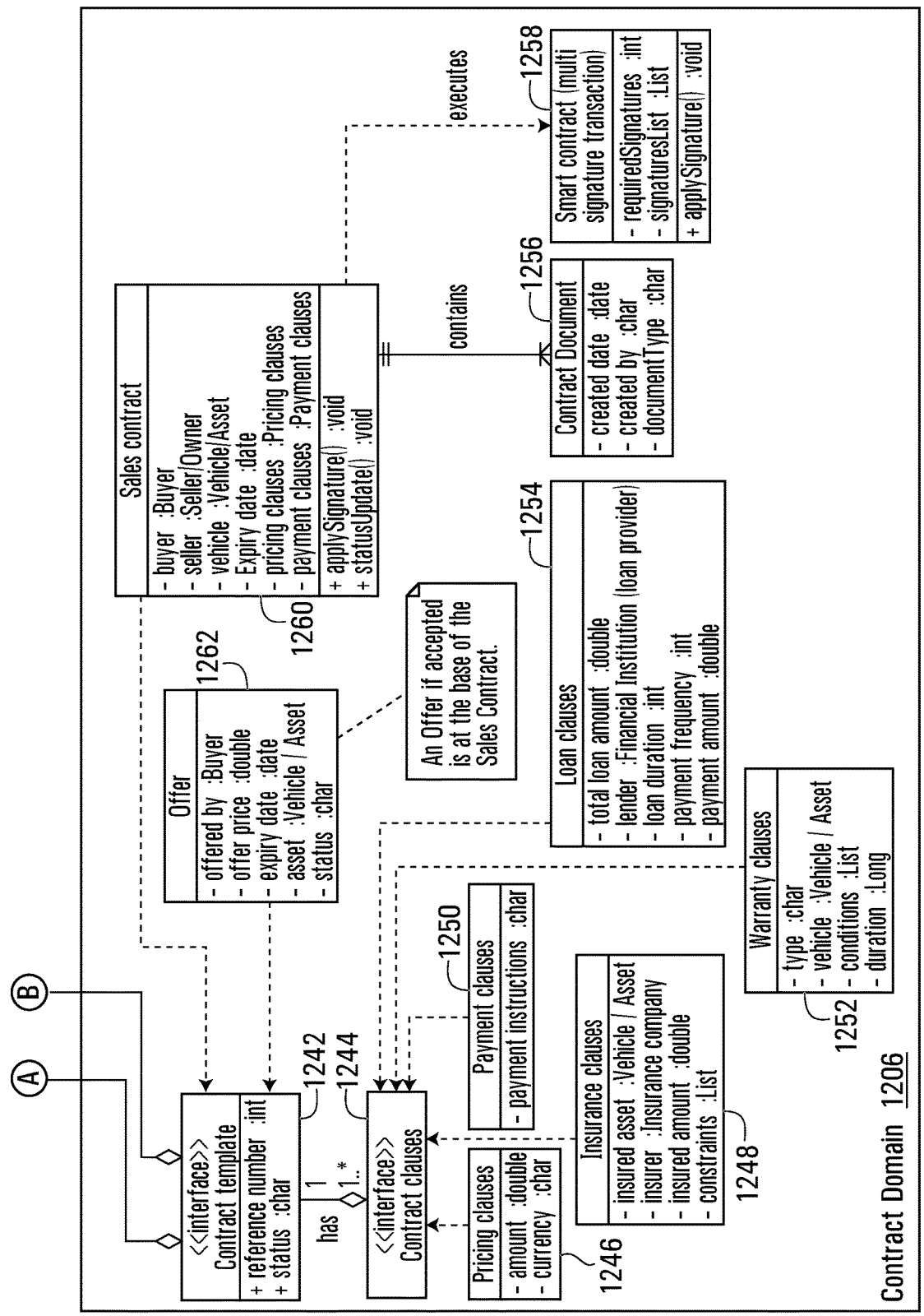

FIGS. 12A and 12B are data model diagrams according to some embodiments. The data model can include a party domain 1202, a network domain 1204, and a contract domain 1206. The network domain 1204 can include a network manager object 1232 and a node object 1234.

The party domain 1202 can include a party object 1226 with example data fields including name, type, parent, role, identity, and so on. A manufacturer object 1210, a dealership object 1212, a collision centre object 1214, a registration agency object 1216, an insurance company object 1218, a financial institution or loan provider object 1220, car servicing centre object 1222, a seller owner object 1224, or a buyer object 1230 can instantiate a party object 1226. An identity object 1208 can include an identifier, name, date of birth, and credentials. An identity object 1208 can be linked to a party object 1226. A permission object 1228 can include a name, type, function, and so on. A financial institution or loan provider object 1220 maintains a credit profile object 1236. A credit profile object 1236 can include an applicant or buyer, a lender or financial institution, a credit score, a loan amount, and so on. A seller or owner object 1224 can own a vehicle or asset object 1238. The vehicle or asset object 1238 can have a fin, brand, model, colour, manufacturer, manufacturing date, used, mileage, and so on. A vehicle or asset object 1238 has an event object 1240. An event object 1240 can have an identifier, name, date, triggered by party, description, and so on.

The contract domain 1206 can include a contract template object 1242. A buyer object 1230 negotiates a contract template object 1242 with a seller or owner object 1224. A sales contract object 1260 and an offer object 1262 instantiate a contract template object 1242. A sales contract object 1260 can include a buyer, seller, vehicle, expiry date, pricing clauses, payment clauses, digital signature, status, and so on. An offer object 1262 can include an offered by buyer, offer price, expiry date, asset identifier, status, and so on. A contract template object 1242 has one or more contract clause objects 1244. Contract clause objects 1244 can link to pricing clause objects 1246, insurance clause objects 1248, payment clause objects 1250, warranty clause objects 1252, loan clause objects 1254, and so on. Pricing clause objects 1246 can include an amount, currency, and so on. Insurance clause objects 1248 can include an insured asset identifier, ensure, insured amount, constraints, and so on. Payment clause objects 1250 can include payment instructions. Warranty clause objects 1252 can include type, vehicle, conditions, duration, and so on. Loan clause objects at 1254 can include total loan amount, lender, loan duration, payment frequency, payment amount, and so on. A contract document object 1256 can link to a sales contract object 1260. A contract document object 1256 can include a created date, created by, document type, and so on. A sales contract object 1260 can execute a smart contract object 1258 with multi-signatures. A smart contract object 1258 can include a list of required signatures and actual electronic signatures.

FIG. 13 is an example permission table 1300 of read and write access for different stakeholders. Example stakeholders include an OEM, dealer, buyer, seller, insurance provider, financing company, collision reporting Centre, owner, registration agency, and so on. The permission table 1300 can indicate read or write access for different data fields of a vehicle record. Example data fields include VIN creation, warranty, packages and accessories added to the vehicle purchase, servicing, accident history, claims, all repair estimates, loan information, insurance information, registration information, recalls, sales price, and so on.

Blockchain Implementation

A blockchain (or "block chain") is a term describing a linked group (database, ledger, or "chain") of data structures called "blocks". Each "block" may, for example, represent a vehicle and transaction data for a vehicle record. The transaction can occur between one or more users, and may include a reference to another block (or more than one block) in the chain that it represents. In some embodiments the block also references an immediately preceding transaction involving the same transferred data; and/or the initial creation of the data.

In some existing implementations, the data being transferred in the blocks may be referred to as cryptocurrency, but in some embodiments described herein, the blockchain technology may be extended and/or adapted in relation to other types of data. A known implementation of a blockchain-based cryptocurrency is Bitcoin. In some embodiments, the data stored in the blockchain may also be associated with a physical currency transfer, the blockchain serving as a record of the transaction details that can be accessed to, for example, validate, audit, and/or review transactions as part of vehicle records.

In some embodiments, to maintain integrity of data transferred using a blockchain, ownership of the data may be designed such that ownership is restricted to transfers between users using the blockchain, and not by any other means. The data being transferred may be data that originated from a secure storage 304 on a first user's computing device, and that data may be transferred to a second user's computing device.

Ownership of the vehicle data may be verified, for example, by configuring the system such that the first user signs the transferred data with a private encryption key. A creation of a block in the blockchain for that transferred data may allow the transfer to occur. Each block may be created in accordance with specific secure protocols typically by one or more computers on a public distributed network. For example, blocks may be created by a process called "mining" which involves numerous computers on the network performing complex mathematical computations. The mining process of block creation is designed to eliminate the risk of a user creating or modifying blocks for the user's own transactions. While mining is one way of creating blocks, there may be other ways and/or other technologies used in the creation of blocks. In some embodiments, blocks are created without a mining process and hashes (e.g., computationally "unique" hashes) may be assigned to various blocks instead.

Blocks may be created (e.g., as an originating block or a block having linkages to previous blocks), and upon creation, the block may require insertion into the blockchain by the distributed network if it is not the first block. If it is the first block, a new blockchain may be established. The blocks link to the vehicle record using the VIN, for example.

In some implementations, the amount of time for insertion and/or validation may be not insignificant. It may take several minutes or longer for a block to be created and validated for insertion into the blockchain by the distributed network. The transaction may not complete until the block is successfully created and inserted in the chain. In accordance with some embodiments, the blockchain and/or blocks themselves may be configured to reduce the amount of time needed for validation and/or insertion, as such time may lead to vulnerabilities in the integrity of the blockchain.

Blocks in the blockchain may be stored and shared across computers in the distributed network, such that each computer, or node, in the network maintains an updated storage of all existing blocks (e.g., on a continual basis, on a periodic basis). In some embodiments, the entire blockchain for each block may be accessible to each node in the distributed network, and each node may be able to trace back the history and original creation of the transferred data by looking at one block and retrieving previous blocks in the chain starting from the reference contained in the last block. Accordingly, it may be difficult to tamper with a block embedded in the blockchain as modifications may be readily identified through computing the hashes based on following entries (e.g., the computed hashes do not match).

Each block in a blockchain may include, for example: vehicle information including an identification/description of the vehicle, VIN and any related data. The data can also include a timestamp indicating the time of the transaction; a hash of the immediately preceding block representing the same cryptocurrency; and a hash of the current block. Other security data may also be included, depending on the particular blockchain implementation. The vehicle and transaction information may also be encrypted in some cases, and either the transaction information or the block itself may be digitally signed by the transferring user's private key.

Blockchain implementation may provide several advantages, including, but not limited to:

(i) blockchains that are difficult to tamper with (e.g., relative to unencrypted, non-blockchain or centralized implementations); for example, a specific block in a blockchain may be computationally impractical to modify once a series of blocks has been "chained" off of the specific block, as each subsequent block in the chain would also have to be located and modified;

(ii) transactions involving a blockchain that can be verified by various parties (e.g., anyone) back to the original creation of the data being transferred, which may be helpful for auditing purposes and may entirely prevent money laundering, counterfeiting of cryptocurrency, or other fraudulent transaction-based activities;

(iii) the distributed nature of most blockchain implementations may provide that one dominant party is unlikely to have a monopoly over transactions using the blockchain;

(iv) control of the blockchain through design parameters of the blockchain, for example, wherein the creation of data or cryptocurrency to be transferred with a blockchain is verifiable as the total amount of cryptocurrency available for exchange using the blockchain and may be strictly controlled (e.g., blocks, blockchains, data and/or cryptocurrency could also be removed from circulation if desired);

(v) widespread adoption across developers as many developers around the world are working on applications for blockchain in a variety of fields, not limited to just finance, and a blockchain-based solution may eventually form the basis for most private, secure internet-based communications over public networks;

(vi) an ability to implement transactions with more time flexibility, as blockchain-based transfers may occur at any time, including weekends and holidays, and are not restricted to any particular entity's business hours;

(vii) the ability to provide difficult to reverse and/or irreversible transactions, providing certainty for users receiving the data (e.g., a separate transaction may be subsequently agreed upon between the parties to return the transferred data); and (viii) an ability to remain anonymized, e.g., through the use of anonymous identifiers to mask the true identities of the users engaged in the blockchain-based transaction, even if information is shared with a public distributed network.

These are example features of blockchains. Blockchains may be well suited for scalable environments (e.g., the number of nodes can be scaled up and down), and/or environments where a high degree of decentralization and/or security are important. There may be simplified and/or potentially more trustworthy maintenance (e.g., through using a specific declarative architecture model), and improved operational efficiency as previously manual and/or cumbersome tasks may be aided and/or automated using the blockchain.

The blockchain may be implemented such that complex business rules may be expressed (e.g., process calculus implementations using calculus (or pi-calculus)), which may aid with modelling, expressing complex relationships and/or dependencies, manipulations, and analyses, etc.

The particular design and implementation of a blockchain ledger may also require some trade-offs to be made in respect of security, efficiency, and robustness. Such design considerations may include, for example, what information to store on the ledgers; the level and/or complexity of encryption; the types of linkages between blocks; the number of nodes; and the validation and/or processing rules; among others.

For example, some design considerations may include:

(i) susceptibility to security flaws (e.g., depending on the implementation, there may be a high degree of reliance on potentially unknown third parties to maintain the integrity of the blockchain's distributed network) that may also result in malicious attacks on the blockchain (e.g., against a public distributed network or on individual stores of cryptocurrency);

(ii) the time required to perform various transactions using a blockchain, this time may be significant (e.g., depending on the speed required, it may be unsuitable for some applications where fast or instant transactions may be desirable, but such drawbacks may potentially be mitigated through design);

(iii) potential collisions due to the nature by which subsequent blocks in a blockchain are created, as sometimes two or more blocks could be created that refer to the same immediately preceding block (e.g., appropriate mechanisms may be provided to handle such occurrences as it is preferable to have un-forked blockchains for transaction verification purposes); and (iv) where blocks are created in multiple forks off of one block, only one of the forks will typically be preserved, while the other forks may be moved to another block—this may result in the correct history for such blocks being lost, or being more difficult to locate.

Figure 4:
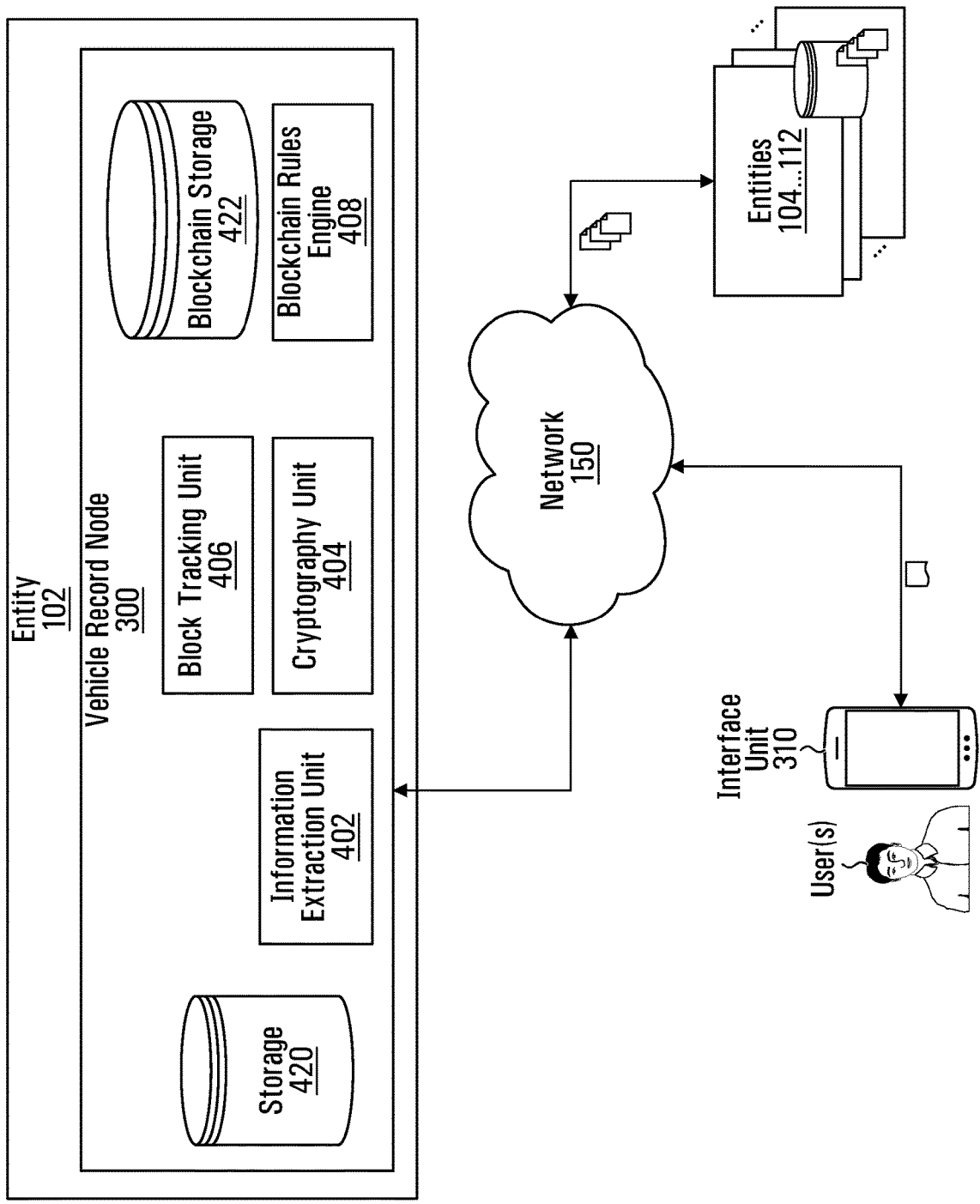
FIG. 4 is a schematic diagram of another electronic blockchain vehicle record node according to some embodiments.

FIG. 4 is a schematic diagram of another electronic blockchain vehicle record node 300, according to some embodiments. The vehicle record node 300 may have different implementations as shown in the various diagrams and corresponding description.

The blockchain vehicle record node 300 manages vehicle records using blocks organized in blockchains and indexed by VINs. Any vehicle owner may be able to register their vehicle on the blockchain vehicle record platform as an authorized entity.

The node 300 may involve one or more units being provided through various computing embodiments, such as using a combination of hardware, software, and/or embedded firmware. For example, the system and its units may be implemented using servers, processors, computer-readable memory, and storage devices, etc. In some embodiments, the system may be provided by distributed resources (e.g., through a "cloud computing" implementation). The vehicle record node 300 may be comprised of units, including an information extraction unit 302, a cryptography unit 304, a block tracking unit 306, a blockchain rules engine 308, a blockchain database 316, a storage 320 and a blockchain storage 322. The vehicle record node 300 may be configured to interact with an interface unit 310, which for example, may be a user system and/or any type of automated system (e.g., interfacing through an API) that may be performing various activities in relation to the blockchain. For example, an interface unit 310 may be a financial institution computing device that indicates that a contract should be added to the blockchain ledger to record financing relating to a vehicle as part of the vehicle record. The interface unit 310 may provide this information through the network 350 to the information extraction unit 302.

The information extraction unit 302 may be configured for extracting various elements of information from information sources, such as contracts, transaction records, documents, financial statements, etc. These information sources may provide information in the form of electronic documentation, etc. In some embodiments, the information extraction unit 302 is configured to anonymize and/or redact information, and/or extract only a subset of information relevant to a particular purpose. This information may be stored at the storage 320 as a block of the vehicle record.

The cryptography unit 304 may be configured for encrypting and/or otherwise transforming information provided by the information extraction unit 302, for example, applying various encryption algorithms and/or techniques (e.g., public key/private key encryption) to extracted elements of information. In some embodiments, the cryptography unit 304 may be configured to generate information which may be utilized in the formation and/or generation of one or more blocks for insertion and/or addition into the blockchain.

The block tracking unit 306 may be configured for maintaining relationships and/or associations identifying how blocks may be related to one another, and/or the identity of various blocks (e.g., identifying what information is associated with each block). The vehicle record includes blocks linked by VIN. The block tracking unit 306 may be configured for identifying a set of blocks using the VIN to generate reports for the vehicle record. The reports can be transmitted to the interface unit 310.

The blockchain rules engine 308 may be configured for maintaining and updating one or more blockchains The blockchain rules engine 308 may be configured, for example, to apply, execute, update, etc., various rules and/or logic associated with the blockchain. For example, rules may be associated with consensus requirements and permission attributes for updating blocks, adding blocks and/or deleting blocks, validating new blocks, rejecting new blocks, etc. The rules may be stored in the storage 320, or in the blockchain storage 322.

The blockchain storage 322 may be configured to store information associated with the blockchain, such as the blockchain ledger, blockchain entries, information stored on various blocks, linkages between blocks, and rules associated with the blockchain, etc. The storage 320 and/or blockchain storage 322 may be provided using various types of storage technologies, such as solid state drives, hard disk drives, flash memory, and may be stored in various formats, such as relational databases, non-relational databases, flat files, spreadsheets, and extended markup files, etc.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The node 300 connects to other components in various ways including directly coupled and indirectly coupled via the network 150. The network 150 is capable of carrying data. The network 150 can involve wired connections, wireless connections, or a combination thereof. The network 150 may involve different network communication technologies, standards and protocols, such as for example Global System for Mobile Communications (GSM), Code division multiple access (CDMA), wireless local loop, WMAX, Bluetooth, Long Term Evolution (LTE) and so on. The network 150 may involve different physical media such as a coaxial cable, fiber optics, transceiver stations and so on. Example network types include the Internet, Ethernet, plain old telephone service (POTS) line, public switched telephone network (PSTN), integrated services digital network (ISDN), digital subscriber line (DSL), and others, including any combination of these. The network 150 can be a local area network or wide area network.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and a combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Figure 6:
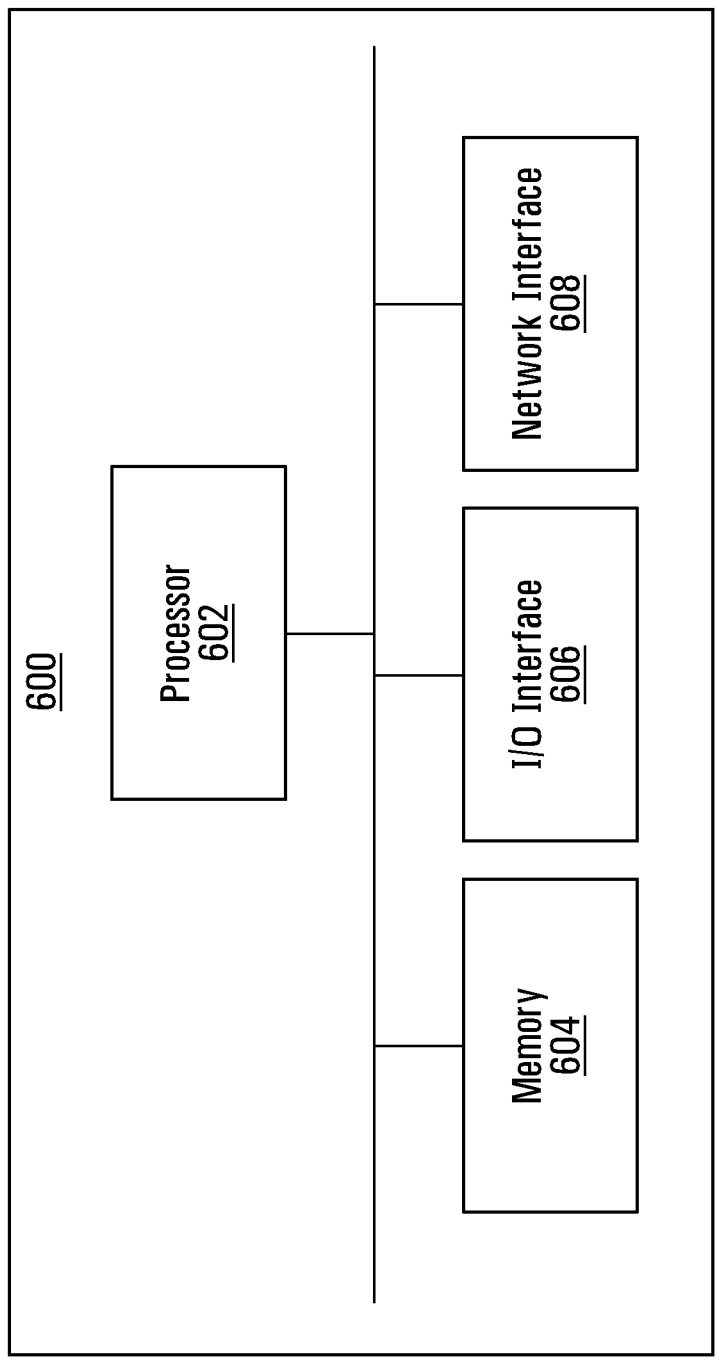
FIG. 6 is a diagram of computing device.
Figure 7A:
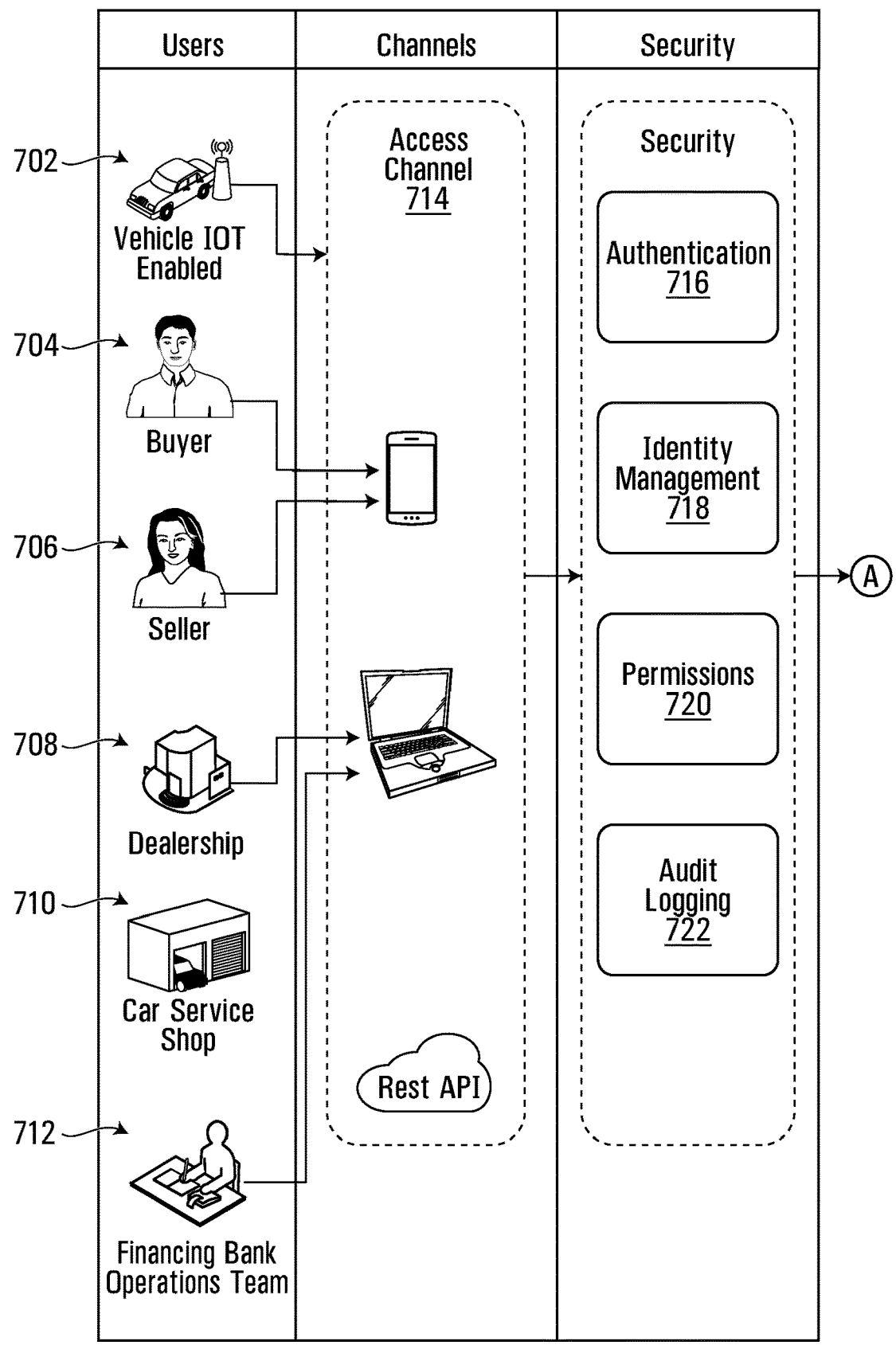
FIGS. 7A, 7B, 7C, 7D are diagrams of a system context diagram according to some embodiments.
Figure 7B:
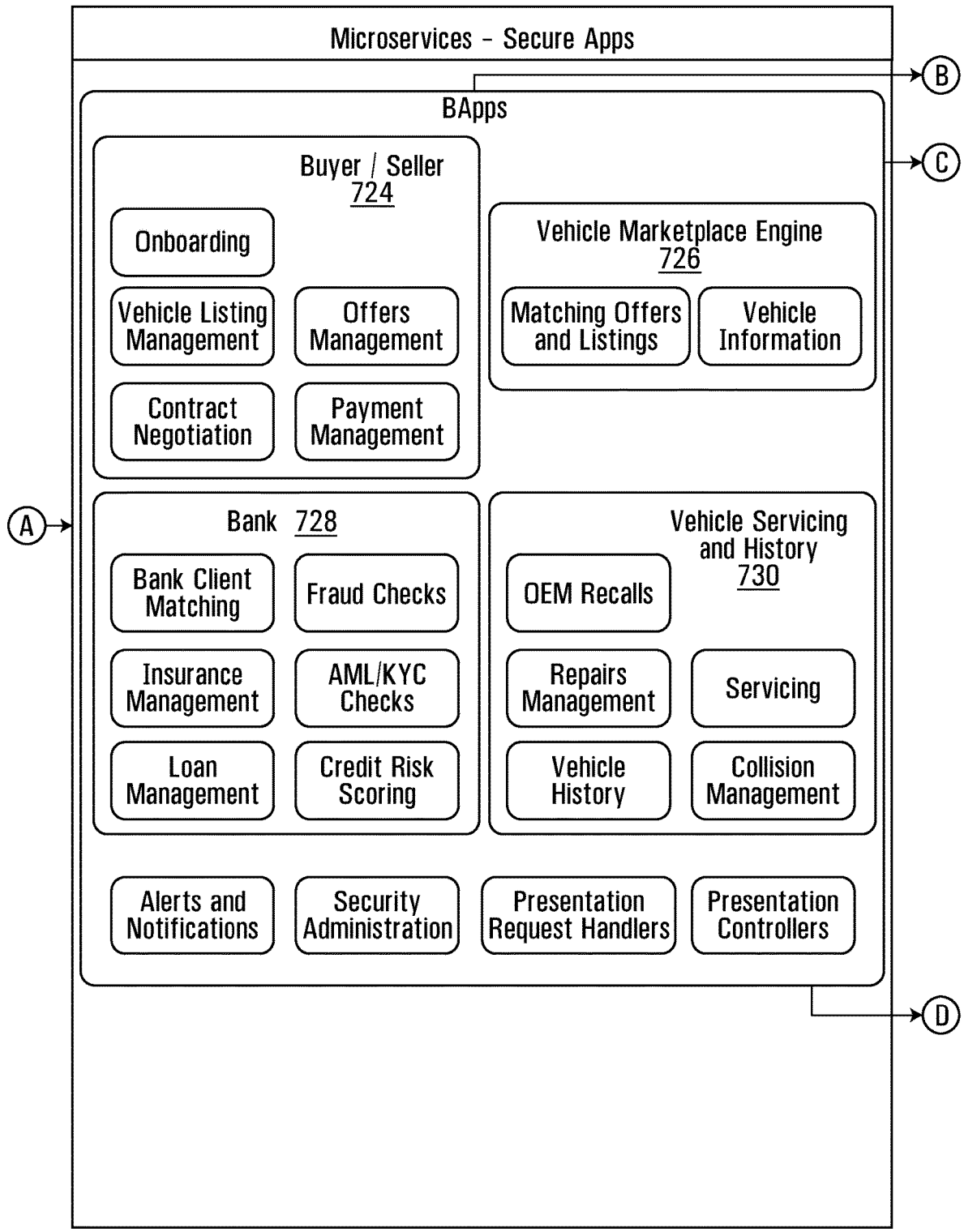
Figure 7C:
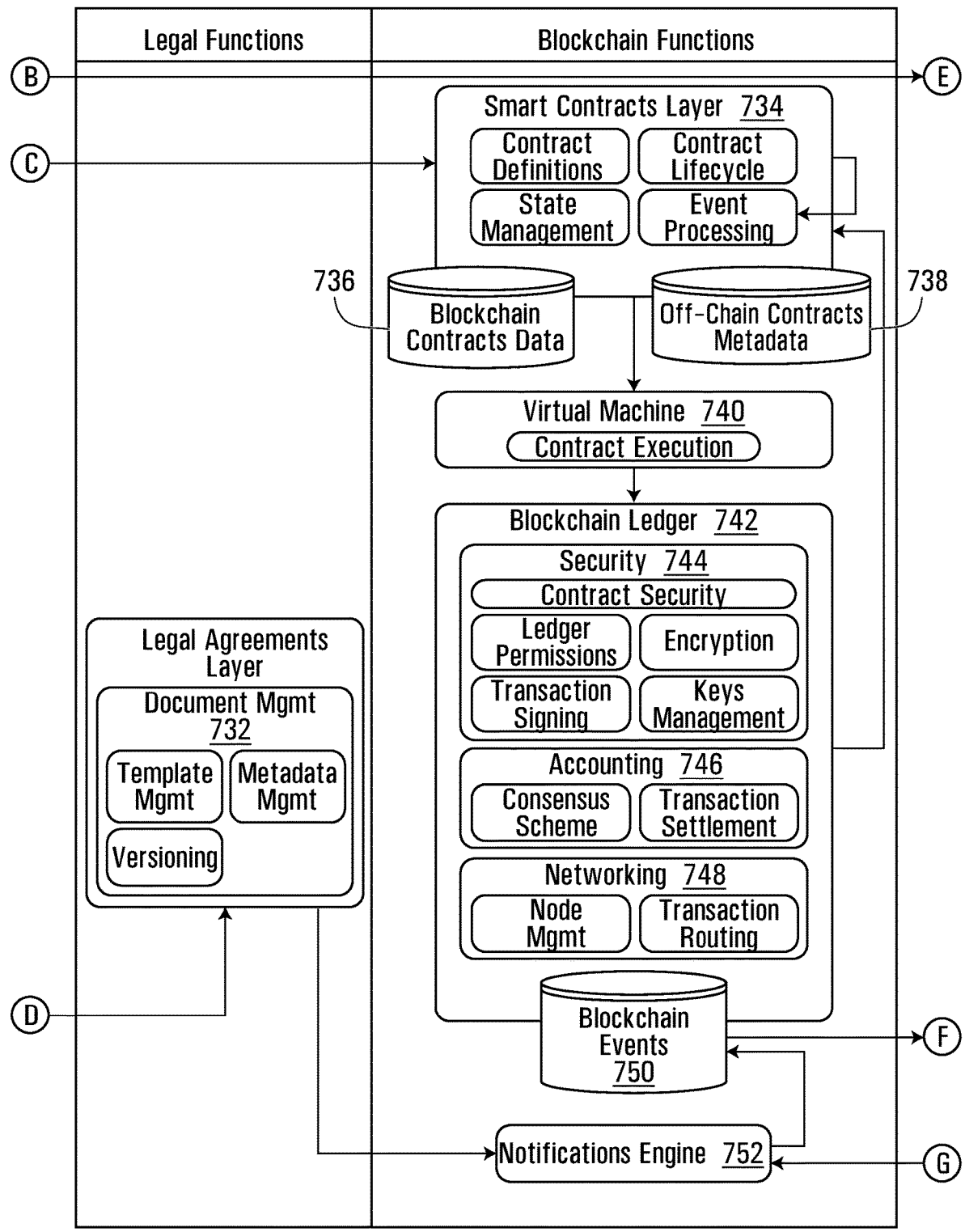
Figure 7D:
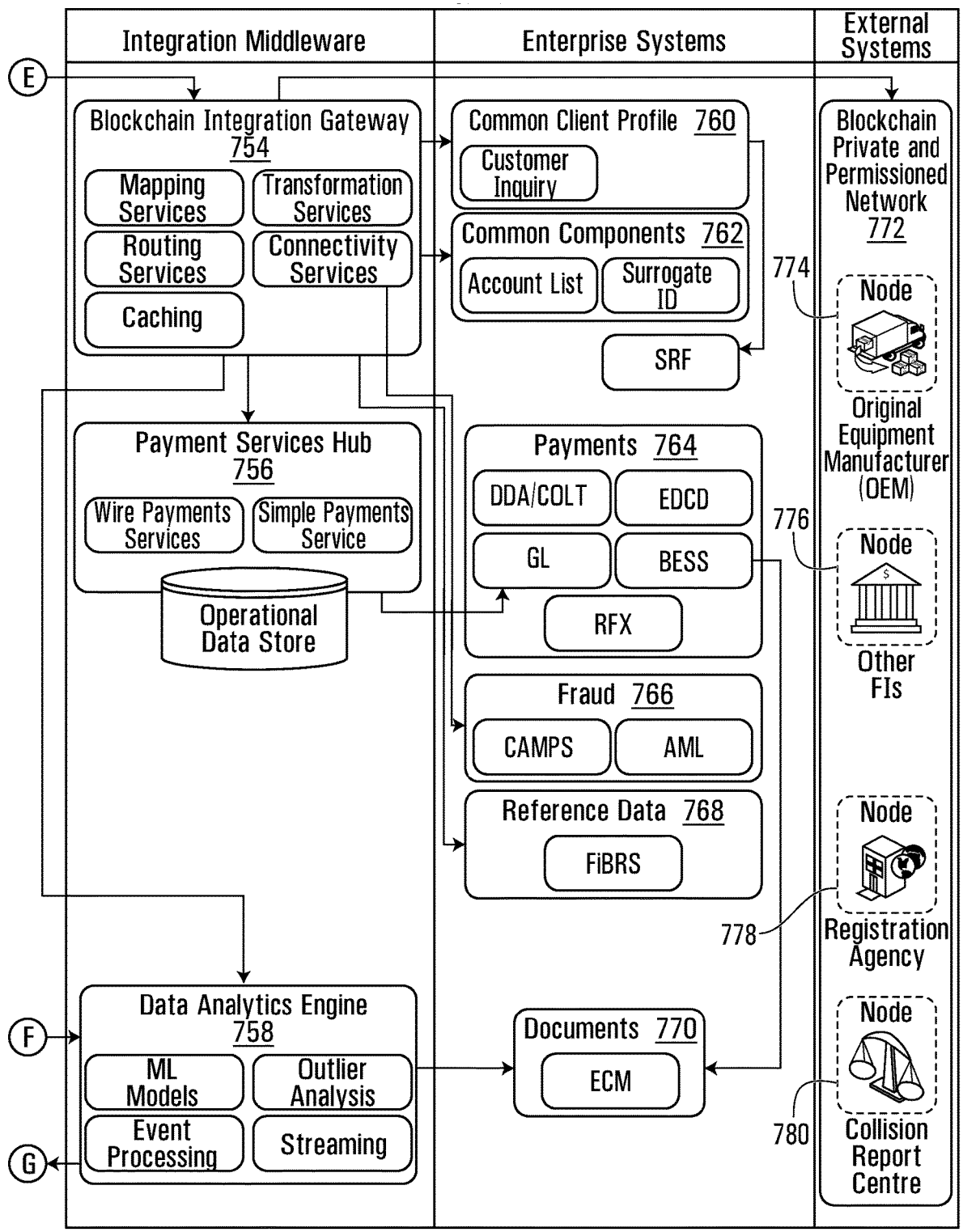

FIG. 6 is a schematic diagram of a computing device 600, exemplary of an embodiment. As depicted, the computing device 4 includes at least one processor 602, memory 604, at least one I/O interface 606, and at least one network interface 608.

Each processor 602 may be, for example, any type of general-purpose microprocessor or microcontroller, a digital signal processing (DSP) processor, an integrated circuit, a field programmable gate array (FPGA), a reconfigurable processor, or any combination thereof.

Memory 604 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 606 enables the computing device 600 to interconnect with one or more input devices, such as a keyboard, mouse, camera, touch screen and a microphone, or with one or more output devices such as a display screen and a speaker.

Each network interface 608 enables the computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The computing device 600 is operable to register and authenticate users (using a login, unique identifier, and password for example) prior to providing access to applications, a local network, network resources, other networks and network security devices. A computing device 4 may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for updating electronic vehicle records using blocks stored on storage devices, the system comprising:
  a distributed ledger of a plurality of nodes, each node including at least a storage device, and the distributed ledger having a plurality of blocks stored on the storage devices, each block comprising a vehicle identification number, vehicle data, a timestamp indicating when the block was created, and a hash reference for the ledger;
  a vehicle marketplace engine with a network interface configured to access storage devices of the plurality of nodes of the distributed ledger to generate a vehicle listing of a vehicle record using a processor that connects with the plurality of nodes of the distributes ledger to determine a set of blocks of the plurality of blocks, the set of blocks having the same vehicle identification number, and read data from the set of blocks of the plurality blocks stored on the storage devices to populate the vehicle listing with the data;
  a buyer and seller application configured to:
    receive a bid for the vehicle listing from a buyer;
    transmit a notification of the bid to a seller;
    receive an acceptance of the bid from the seller;
  a smart contracts middleware layer configured to generate a smart contract for the vehicle listing and store the smart contract in memory, the smart contract including a buyer electronic signature, a seller electronic signature, and code defining transaction terms; and
  an integration middleware layer with a processor configured to:
    execute the code defining transaction terms by accessing the smart contract in the memory and transmit instructions for releasing payment; and store another block on a storage device of a node of the distributed ledger, the other block for verification of the transaction, the other block comprising the same vehicle identification number, buyer identification, seller identification, and the smart contract.

2. The system of claim 1 further comprising a security unit configured to verify the seller by receiving seller credentials prior to transmitting the notification.

3. The system of claim 1 further comprising a security unit configured to verify the buyer by receiving buyer credentials and providing access to the vehicle record.

4. The system of claim 1, wherein a block of the set of blocks is an initial block for the vehicle record, the initial block comprising a vehicle registration, ownership attributes, and permission attributes for the vehicle record.

5. The system of claim 4 further comprising a security unit configured to verify the seller by receiving seller credentials and compare the seller credentials to the ownership attributes, and to verify the buyer by receiving buyer credentials, and compare the buyer credentials to the permission attributes, and providing access to the vehicle record.

6. The system of claim 1 wherein the integration middleware layer is configured to receive a vehicle registration request, verify the vehicle registration request, and generate an initial block for the vehicle record, the initial block comprising a vehicle registration, ownership attributes, permission attributes for the vehicle record, and the same vehicle identification number.

7. The system of claim 1 further comprising a vehicle history application configured to receive a vehicle service event identifying the same vehicle identification number, generate an additional block for the vehicle record, the additional block comprising repair attributes, and the same vehicle identification number.

8. The system of claim 1 further comprising a vehicle history application configured to receive a vehicle accident event identifying the same vehicle identification number and generate an additional block for the vehicle record, the additional block comprising accident attributes and the same vehicle identification number.

9. The system of claim 1 further comprising a vehicle history application configured to receive a manufacturer recall event identifying the same vehicle identification number and generate an additional block for the vehicle record, the additional block comprising recall attributes and the same vehicle identification number.

10. The system of claim 1 wherein the buyer and seller application is configured to receive a seller registration request, verify the seller registration request, and generate an additional block for the vehicle record, the additional block comprising seller attributes and the same vehicle identification number.

11. The system of claim 1 wherein the buyer and seller application is configured to receive a buyer registration request, verify the buyer registration request, and generate an additional block for the vehicle record, the additional block comprising buyer attributes and the same vehicle identification number.

12. The system of claim 1 wherein the buyer and seller application is configured to receive a credit risk request for the buyer, receive a credit score for the buyer, and generate an additional block for the vehicle record, the additional block comprising buyer attributes, the credit score, and the same vehicle identification number.

13. The system of claim 1 wherein the vehicle marketplace engine is configured to receive a vehicle search request with a set of parameters and identify the vehicle record based on the vehicle search request by comparing the set of parameters to the vehicle data of the vehicle record.

* * * * *